US012527542B2

(12) United States Patent
Lee et al.

(10) Patent No.: US 12,527,542 B2
(45) Date of Patent: Jan. 20, 2026

(54) ULTRASOUND IMAGING APPARATUS FOR BIPLANE IMAGING AND CONTROL METHOD THEREOF

(71) Applicant: SAMSUNG MEDISON CO., LTD., Gangwon-do (KR)

(72) Inventors: Jin Yong Lee, Seoul (KR); Young Seuk Song, Seoul (KR)

(73) Assignee: SAMSUNG MEDISON CO., LTD., Gangwon-do (KR)

( * ) Notice: Subject to any disclaimer, the term of this patent is extended or adjusted under 35 U.S.C. 154(b) by 0 days.

(21) Appl. No.: 17/165,325

(22) Filed: Feb. 2, 2021

(65) Prior Publication Data
US 2021/0236083 A1    Aug. 5, 2021

(30) Foreign Application Priority Data

Feb. 4, 2020    (KR) ........................ 10-2020-0012962

(51) Int. Cl.
*A61B 8/00* (2006.01)
*A61B 8/02* (2006.01)
*A61B 8/08* (2006.01)

(52) U.S. Cl.
CPC ................ *A61B 8/02* (2013.01); *A61B 8/461* (2013.01); *A61B 8/5207* (2013.01);
(Continued)

(58) Field of Classification Search
CPC ......... A61B 8/02; A61B 8/461; A61B 8/5207; A61B 8/5269; A61B 8/463; A61B 8/483;
(Continued)

(56) References Cited

U.S. PATENT DOCUMENTS 6,148,095 A    11/2000    Prause et al.
6,549,802 B2    4/2003    Thornton
(Continued)

FOREIGN PATENT DOCUMENTS

EP    3456266 A1 *    3/2019    .......... A61B 8/0841
JP    2007-325786 A    12/2007
(Continued)

OTHER PUBLICATIONS

Devore, G R et al. "Spatio-temporal image correlation (STIC): new technology for evaluation of the fetal heart." Ultrasound in obstetrics & gynecology : the official journal of the International Society of Ultrasound in Obstetrics and Gynecology vol. 22,4 (2003): 380-7. doi:10.1002/uog.217 (Year: 2003).*
(Continued)

*Primary Examiner* — Joel Lamprecht
*Assistant Examiner* — James F Mcdonald, III
(74) *Attorney, Agent, or Firm* — MORGAN, LEWIS & BOCKIUS LLP

(57) ABSTRACT

The ultrasound imaging apparatus according to an embodiment includes: a display configured to display an ultrasound image; an ultrasound probe configured to transmit an ultrasound signal to an object and receive an ultrasound echo signal; and a controller configured to obtain a 4D image of a heart at a first position of the object by processing the ultrasound echo signal, obtain a biplane image of the heart in a second position different from the first position, when an artifact is detected in the biplane image, extract a second cross-sectional image corresponding to a first cross-sectional image in which the artifact is detected among the biplane images from the 4D image and control the display to display the second cross-sectional image.

12 Claims, 19 Drawing Sheets

(52) U.S. Cl.
CPC .......... *A61B 8/5269* (2013.01); *A61B 8/0866* (2013.01); *A61B 8/5223* (2013.01); *A61B 8/523* (2013.01); *G06T 2207/30048* (2013.01)

(58) Field of Classification Search
CPC ....... A61B 8/0883; A61B 8/54; A61B 8/0866; A61B 8/5223; A61B 8/523; G06T 2207/30048
See application file for complete search history.

(56) References Cited

U.S. PATENT DOCUMENTS

| | | | |
|---|---|---|---|
| 6,628,977 | B2 | 9/2003 | Graumann et al. |
| 7,421,101 | B2 | 9/2008 | Georgescu et al. |
| 8,620,055 | B2 | 12/2013 | Barratt et al. |
| 8,724,874 | B2 | 5/2014 | Wein et al. |
| 8,792,964 | B2 | 7/2014 | Maschke |
| 10,413,185 | B1 * | 9/2019 | Boveja ................. A61B 5/0035 |
| 10,456,116 | B2 | 10/2019 | Duncan et al. |
| 10,943,147 | B2 | 3/2021 | Rao et al. |
| 2004/0066958 | A1 * | 4/2004 | Chen ....................... A61B 6/466 382/128 |
| 2004/0243001 | A1 * | 12/2004 | Zagzebski ........... G01S 15/8995 600/437 |
| 2007/0100238 | A1 | 5/2007 | Kwon et al. |
| 2008/0249414 | A1 * | 10/2008 | Yang ..................... A61B 8/0883 600/445 |
| 2008/0294052 | A1 * | 11/2008 | Wilser ..................... A61B 8/14 600/459 |
| 2010/0198073 | A1 * | 8/2010 | Nishihara ............... A61B 8/483 600/443 |
| 2011/0038517 | A1 * | 2/2011 | Mistretta ................. A61B 6/485 382/128 |
| 2011/0235889 | A1 * | 9/2011 | Spahn ..................... A61B 6/487 378/42 |
| 2014/0052000 | A1 * | 2/2014 | Buckton ............. G01S 7/52065 600/443 |
| 2015/0190112 | A1 * | 7/2015 | Yeo ....................... A61B 8/0866 600/443 |
| 2016/0135775 | A1 * | 5/2016 | Mistretta ............... G06T 7/0012 600/419 |
| 2016/0242740 | A1 * | 8/2016 | Day ......................... A61B 8/14 |
| 2017/0301124 | A1 | 10/2017 | Dala-Krishna |
| 2018/0132829 | A1 | 5/2018 | Park et al. |
| 2018/0275258 | A1 | 9/2018 | Pintoffl et al. |
| 2019/0183462 | A1 | 6/2019 | Yang et al. |
| 2019/0192118 | A1 | 6/2019 | Roundhill |
| 2019/0216417 | A1 * | 7/2019 | Shaughnessy ....... A61B 6/5217 |
| 2019/0350538 | A1 * | 11/2019 | Wilson ................... G06T 5/001 |
| 2020/0015785 | A1 * | 1/2020 | Attia ...................... A61B 8/483 |

FOREIGN PATENT DOCUMENTS

| | | | |
|---|---|---|---|
| JP | 2012-120692 | A | 6/2012 |
| JP | 2015-186494 | A | 10/2015 |
| JP | 6367261 | B2 | 8/2018 |
| KR | 10-0880125 | B1 | 1/2009 |
| KR | 10-2014504 | B1 | 8/2019 |
| KR | 10-2655299 | B1 | 4/2024 |
| WO | 2014/039935 | A1 | 3/2014 |
| WO | WO-2014155272 | A1 * | 10/2014 ............ A61B 8/483 |
| WO | 2019/110294 | A1 | 6/2019 |

OTHER PUBLICATIONS

Yagel, S et al. "3D and 4D ultrasound in fetal cardiac scanning: a new look at the fetal heart." Ultrasound in obstetrics & gynecology : the official journal of the International Society of Ultrasound in Obstetrics and Gynecology vol. 29,1 (2007): 81-95. doi: 10.1002/uog 3912 (Year: 2007).*
Extended European Search Report dated Jun. 21, 2021 issued in European Patent Application No. 21154760.9.
G. DeVore, et al., "Three-dimensional imaging of the fetal heart: Current applications and future directions," Progress In Pediatric Cardiology, vol. 22, 2006, pp. 9-29.
R. Chaoui, et al., "New developments in fetal heart scanning: Three- and four-dimensional fetal echocardiography," Seminars in Fetal & Nenonatal Medicine, vol. 10, 2005, pp. 567-577.
European Communication dated Sep. 27, 2023 issued in European Patent Application No. 21154760.9.
Office Action issued Feb. 16, 2024 for European Patent Application No. 21154760.9.
Notice of Allowance dated Oct. 17, 2024, issued in corresponding Korean Patent Application No. 10-2020-0012962 with an English translation.

* cited by examiner

FIG. 11
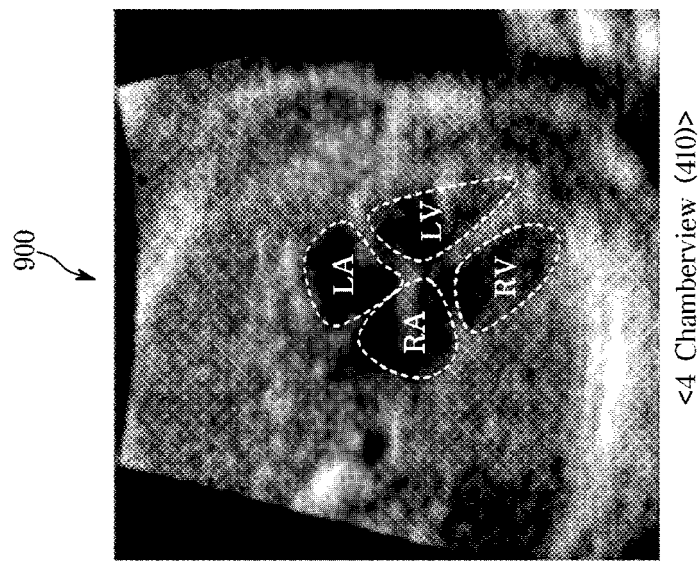
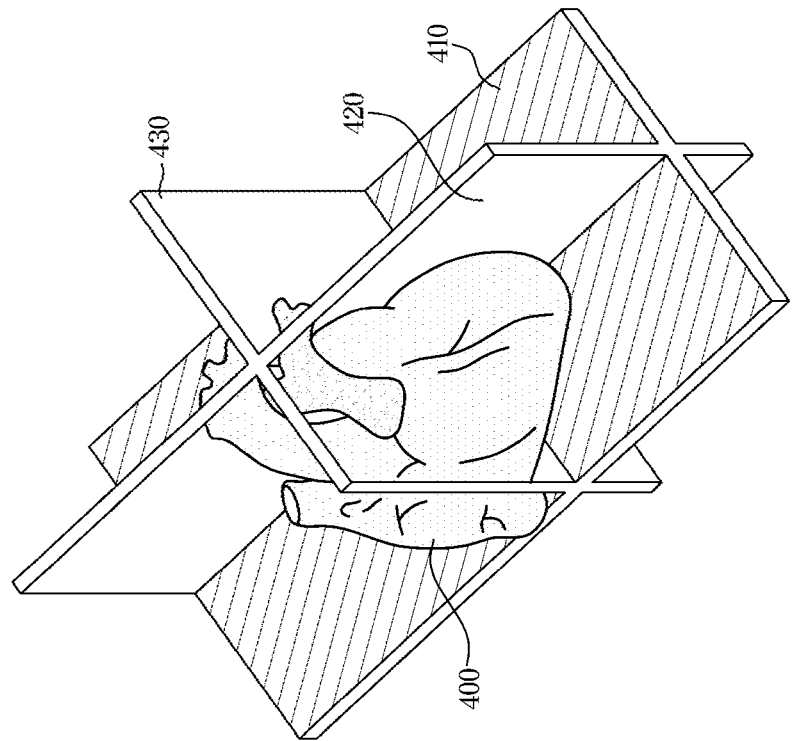

FIG. 12
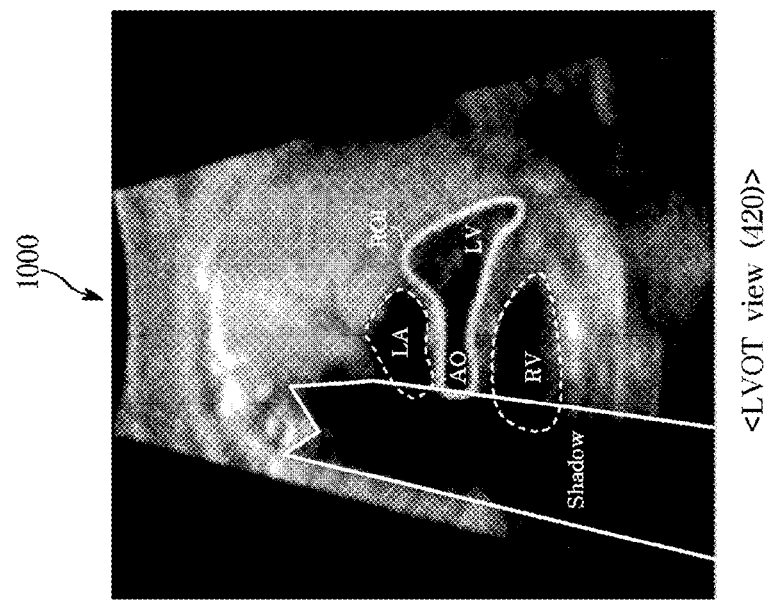
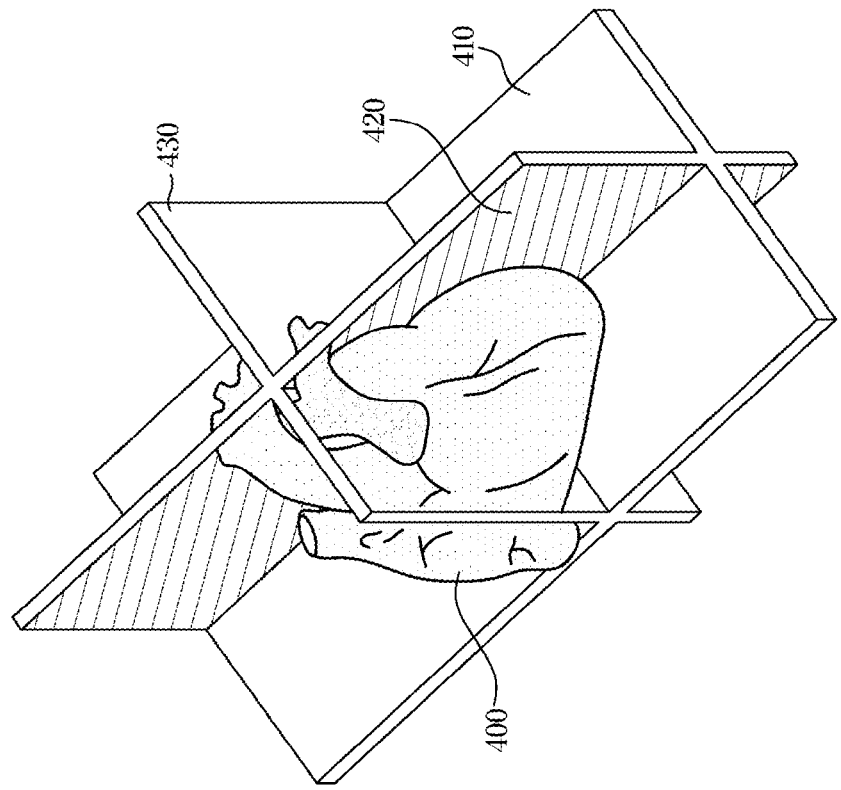

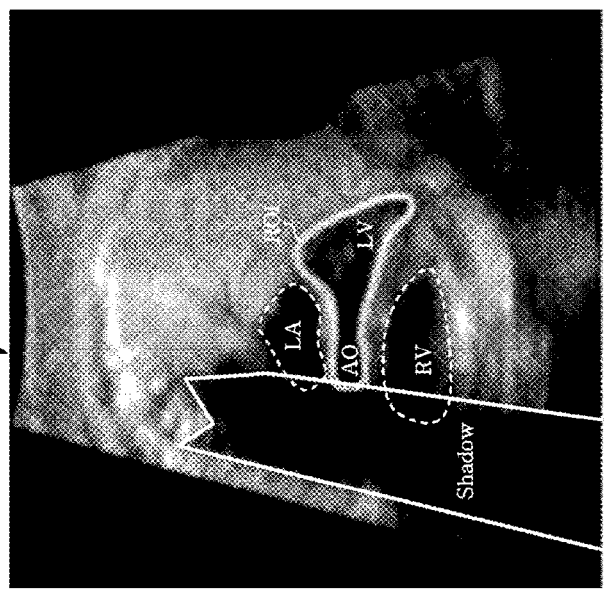
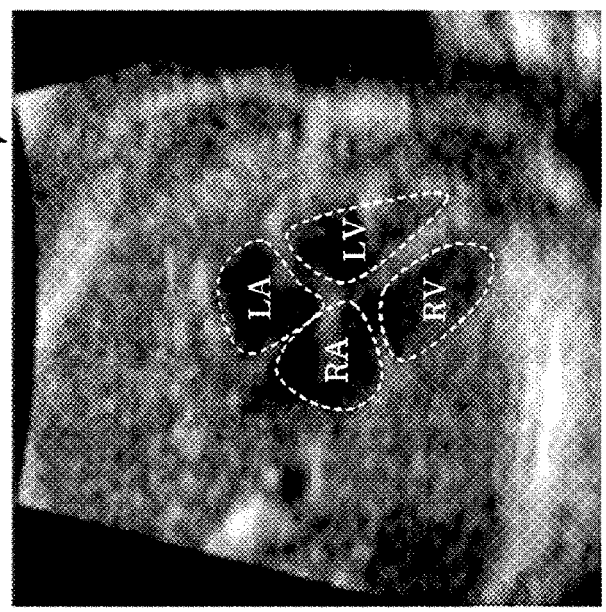
FIG. 13

ULTRASOUND IMAGING APPARATUS FOR BIPLANE IMAGING AND CONTROL METHOD THEREOF

CROSS-REFERENCE TO RELATED APPLICATION

This application is based on and claims priority under 35 U.S.C. § 119 to Korean Patent Application No. 10-2020-0012962, filed on Feb. 4, 2020 in the Korean Intellectual Property Office, the disclosure of which is incorporated herein by reference.

BACKGROUND

1. Technical Field

The disclosure relates to an ultrasound imaging apparatus and a control method thereof.

2. Description of the Related Art

Ultrasound imaging apparatuses operate to irradiate an ultrasound signal generated from an ultrasound probe transducer to a target site inside an object through the surface of the object and noninvasively acquire tomographic images or blood stream images of soft tissues using information about an ultrasound signal (an ultrasound echo signal) reflected from the object.

The ultrasound imaging apparatus has advantages in that it is compact and inexpensive, is displayable in real time, and has high safety compared to X-ray diagnostic devices due to having no risk of exposure to X-rays or the like, and thus are widely used for cardiac, breast, abdominal, urinary, and obstetrical diagnoses.

In addition, the ultrasound imaging apparatus may display a target in the body as a 3D image and/or a 4D image, and may simultaneously acquire and display images of several cross-sections of the target. However, acquiring and displaying multiple cross-sectional images at the same time is considered to be inferior in performance to acquiring and displaying 2D images of each cross-section separately.

SUMMARY

Therefore, it is an object of the disclosure to provide an ultrasound imaging apparatus capable of improving the quality of a biplane image and a control method thereof.

Therefore, it is an aspect of the disclosure to provide an ultrasound imaging apparatus including: a display configured to display an ultrasound image; an ultrasound probe configured to transmit an ultrasound signal to an object and receive an ultrasound echo signal; and a controller configured to obtain a 4D image of a heart at a first position of the object by processing the ultrasound echo signal, obtain a biplane image of the heart in a second position different from the first position, when an artifact is detected in the biplane image, extract a second cross-sectional image corresponding to a first cross-sectional image in which the artifact is detected among the biplane images from the 4D image and control the display to display the second cross-sectional image.

The controller may be configured to control the display to simultaneously display the biplane image including the first cross-sectional image and the second cross-sectional image.

The controller may be configured to control the display to display by replacing the first cross-sectional image with the second cross-sectional image.

The controller may be configured to control the display to display by overlaying the second cross-sectional image on the first cross-sectional image.

The controller may be configured to determine a shadow detected in the biplane image as the artifact.

The controller may be configured to identify anatomical features of the region of interest in the first cross-sectional image, and extract the second cross-sectional image including the anatomical feature of the region of interest from the 4D image.

The controller may be configured to extract the second cross-sectional image including the anatomical feature that matches the shape, size and position of the region of interest in the first cross-sectional image from the 4D image.

The controller may be configured to extract the second cross-sectional image from the 4D image based on a predefined standard view.

The controller may be configured to adjust the direction of the second cross-sectional image to match the direction of the first cross-sectional image, and control the display to display the second cross-sectional image whose the direction is adjusted.

The controller may be configured to align the frames of the second cross-sectional image based on the phase of the heart rate period associated with the first cross-sectional image, and control the display to display the second cross-sectional image in synchronization with the heart rate period.

It is an aspect of the disclosure to provide a control method of an ultrasound imaging apparatus, the method includes: obtaining a 4D image of a heart at a first position of the object by processing the ultrasound echo signal; obtaining a biplane image of the heart in a second position different from the first position; detecting an artifact in the biplane image; extracting a second cross-sectional image corresponding to a first cross-sectional image in which the artifact is detected among the biplane images from the 4D image; and displaying the second cross-sectional image on the display.

The displaying the second cross-sectional image on the display may include: simultaneously displaying the biplane image including the first cross-sectional image, and the second cross-sectional image.

The displaying the second cross-sectional image on the display may include: displaying by replacing the first cross-sectional image with the second cross-sectional image.

The displaying the second cross-sectional image on the display may include: displaying by overlaying the second cross-sectional image on the first cross-sectional image.

The detecting the artifact may include: determining a shadow detected in the biplane image as the artifact.

The extracting the second cross-sectional image from the 4D image may include: identifying anatomical features of the region of interest in the first cross-sectional image; and extracting the second cross-sectional image including the anatomical feature of the region of interest from the 4D image.

The extracting the second cross-sectional image from the 4D image may include: extracting the second cross-sectional image including the anatomical feature that matches the shape, size and position of the region of interest in the first cross-sectional image from the 4D image.

The extracting the second cross-sectional image from the 4D image may include: extracting the second cross-sectional image from the 4D image based on a predefined standard view.

The displaying the second cross-sectional image on the display may include: adjusting the direction of the second cross-sectional image to match the direction of the first cross-sectional image.

The displaying the second cross-sectional image on the display may include: aligning the frames of the second cross-sectional image based on the phase of the heart rate period associated with the first cross-sectional image; and displaying the second cross-sectional image in synchronization with the heart rate period.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 11 illustrates an apical 4-chamber view as an example of a cross-sectional image constituting a biplane image.

FIG. 12 illustrates a left ventricular outflow tract view (LVOT view) including artifacts as an example of a cross-sectional image constituting a biplane image.

FIG. 13 illustrates an example in which the biplane images of FIGS. 11 and 12 are displayed on a display of an ultrasound imaging apparatus.

DETAILED DESCRIPTION

Figure 1:
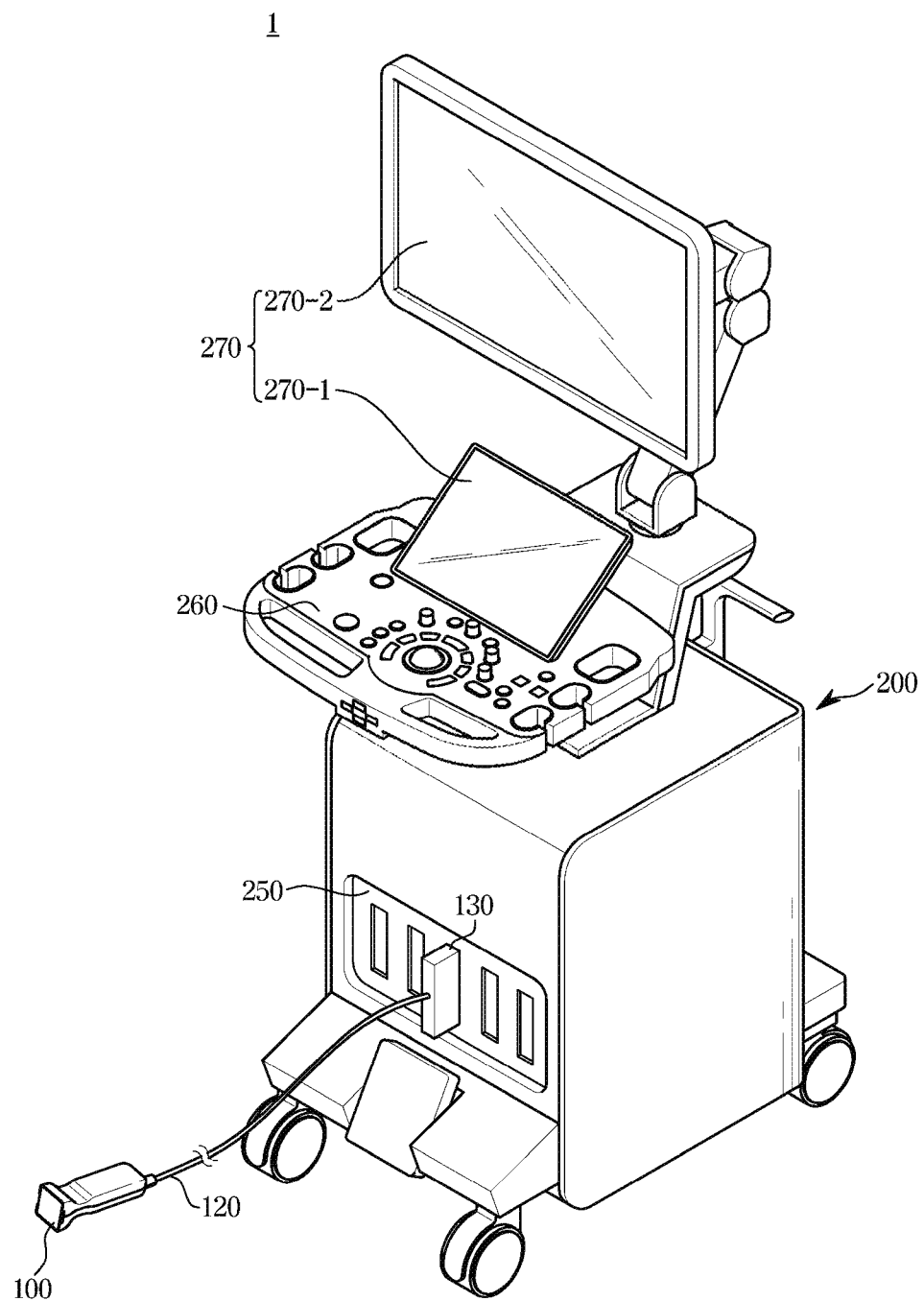
FIG. 1 illustrates an ultrasound imaging apparatus according to an embodiment.

Like numerals refer to like elements throughout the specification. Not all elements of embodiments of the present disclosure will be described, and description of what are commonly known in the art or what overlap each other in the embodiments will be omitted.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, Although the terms "first," "second," "A," "B," etc. may be used to describe various components, the terms do not limit the corresponding components, but are used only for the purpose of distinguishing one component from another component. As used herein, the singular forms "a," "an" and "the" are intended to include the plural forms as well, unless the context clearly indicates otherwise.

Moreover, terms described in the specification such as "part," "module," and "unit," refer to a unit of processing at least one function or operation, and may be implemented by software, a hardware component such as a field-programmable gate array (FPGA) or an application-specific integrated circuit (ASIC), or a combination of software and hardware.

Reference numerals used for method steps are just used for convenience of explanation, but not to limit an order of the steps. Thus, unless the context clearly dictates otherwise, the written order may be practiced otherwise.

An 'object' may include a person or animal, or part of a person or animal. For example, the object may include not only a mass but also organs such as the liver, heart, uterus, brain, breast, abdomen, or blood vessels. In addition, in the specification, the "user" may be a doctor, a nurse, a clinical pathologist, a medical imaging expert, or the like, and may be a technician who develops and repairs a medical device, but is not limited thereto.

The term "ultrasound image" and "image of an object" refer to an image of an object obtained using ultrasound waves.

Hereinafter, embodiments of the disclosure will be described in detail with reference to the accompanying drawings FIG. 1 illustrates an ultrasound imaging apparatus according to an embodiment.

Referring to FIG. 1, the ultrasound imaging apparatus 1 includes an ultrasound probe 100 and a main body 200. The ultrasound probe 100 may transmit an ultrasound signal to an object to be diagnosed and receive an ultrasound echo signal reflected from the object. The ultrasound probe 100 receives the ultrasound echo signal reflected from the object and converts the ultrasound echo signal into an electrical signal.

The ultrasound probe 100 may be connected to the main body 200 of the ultrasound diagnostic apparatus 1 through a cable 120, and may receive various signals required for controlling the ultrasound probe P from the main body 200. In addition, the ultrasound probe 100 may transmit an analog signal or a digital signal corresponding to the ultrasound echo signal to the main body 200.

Meanwhile, the ultrasound probe 100 may be implemented as a wireless probe, and may transmit and receive a signal through a network formed between the probe 100 and the main body 200. A detailed description of the probe 100 is described below with reference to FIG. 3 and FIG. 4.

The main body 200 may include a probe select assembly (PSA) board 250, a control panel 260, and a display 280 (280-1 and 280-2). The PSA board 250 includes a port connected to the ultrasound probe 100. The PSA board 250 may activate the ultrasound probe 100 according to a user command input through the control panel 260 and the control of the controller 300. One end of the cable 120 includes a connector 130 connectable to the port of the PSA board 250.

The control panel 260 is a device that receives a command for operating the ultrasound imaging apparatus 1 from a user. The control panel 260 may receive setting information regarding the probe 100, and receive various control commands related to the operation of the main body 200.

The control panel 260 may include a keyboard. The keyboard may include buttons, switches, knobs, touch pads, trackballs, and the like. In addition, the control panel 260 may include a first display 270-1. The first display 270-1 may display a graphic user interface (GUI) for controlling the operation of the ultrasound imaging apparatus 1. The first display 270-1 may display related information, such as a menu or an auxiliary image, for optimizing the ultrasound image.

The first display 270-1 may include a touch panel and receive a user's touch input on the graphic user interface. The first display 270-1 may display a graphic user interface having the same shape as a button included in a keyboard. The user may input a command for controlling the ultrasound imaging apparatus 1 through a touch input to the first display 270-1.

The second display 270-2 may display an ultrasound image. The ultrasound image may be a two-dimensional (2D) ultrasound image, a three-dimensional (3D) ultrasound image, and/or a four-dimensional (2D) ultrasound image and may display various ultrasound images according to an operation mode of the ultrasound imaging apparatus 1. In addition, the second display 270-2 may display menus, guide items, information about an operation state of the probe 100, and the like, which are required for the ultrasound diagnosis.

The second display 270-2 may also include a touch panel and receive a user's touch input on the graphic user interface. The user may input a command for controlling the ultrasound imaging apparatus 1 through a touch input on the second display 270-2.

Although it has been described that the ultrasound image is displayed on the second display 270-2, the ultrasound image may be displayed on the first display 270-1. In other words, the display 270 may display an ultrasound image. The display 270 may be implemented as various display devices, such as a liquid crystal display (LCD), a light emitting diode (LED), a plasma display panel (PDP), and an organic light emitting diode (OLED).

Figure 2:
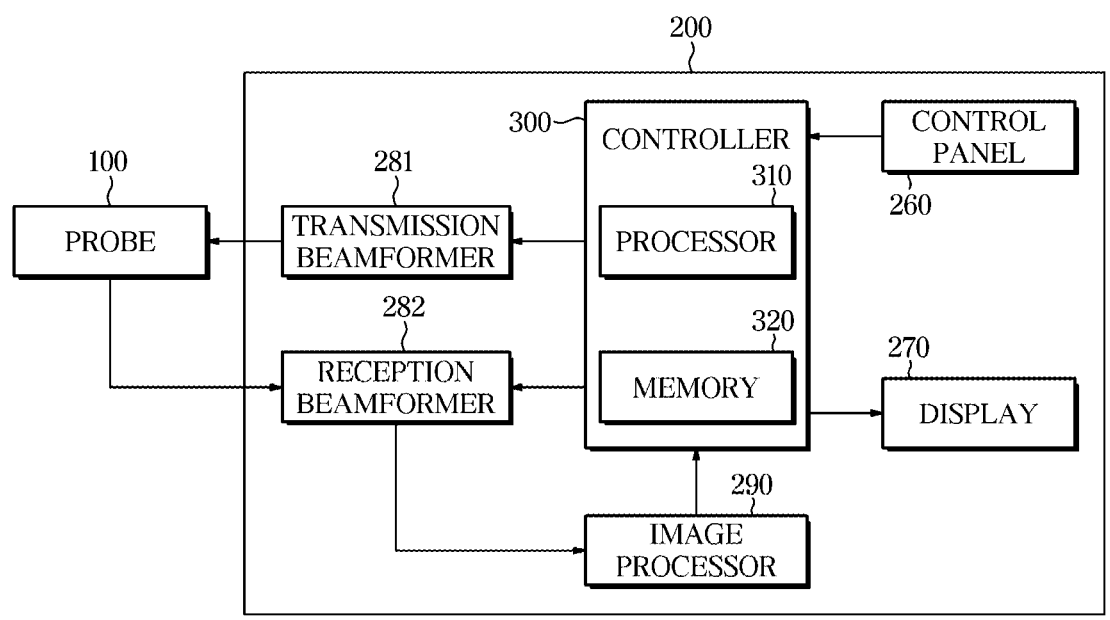
FIG. 2 is a block diagram illustrating a configuration of a main body of an ultrasound imaging apparatus according to an embodiment.

FIG. 2 is a block diagram illustrating a configuration of a main body of an ultrasound imaging apparatus according to an embodiment.

Referring to FIG. 2, the probe 100 may be a matrix probe. By using the matrix probe, 3D volume data of the target may be obtained, and a 3D ultrasound image and/or a 4D ultrasound image may be obtained. A four-dimensional (4D) ultrasound image may represent movement of a three-dimensional image. A two-dimensional cross-sectional image of the target can be obtained.

The probe 100 is not limited to a matrix probe. For example, the probe 100 may be a curved array probe, a phased array probe, a volume probe, an endocavity probe, a convex probe or a 3D probe.

The main body 200 of the ultrasound imaging apparatus 1 may further include beamformers 281 and 282, an image processor 290, and a controller 300.

The beamformer may be divided into a transmission beamformer 281 and a reception beamformer 282. In obtaining an image using an ultrasound signal, a beamforming technique is used to increase the resolution of the image. The transmission beamformer 281 may apply a transmission pulse to the ultrasound probe 100. The transmission beamformer 281 may apply an appropriate time delay so that ultrasound signals to be transmitted by a plurality of transducer elements are simultaneously focused at one focal point, and generate a transmission beam. A transducer array 110 may transmit the transmission beam to a target site in the object.

The ultrasound transmitted to the object may be reflected from the object and may be incident back to the transducer array 110 of the ultrasound probe 100. The reflected ultrasound signal may be defined as an ultrasound echo signal.

The reception beamformer 281 performs analog/digital conversion on the ultrasound echo signal received from the ultrasound probe 100 and performs reception beamforming. The reception beamformer 281 may apply a time delay to the ultrasound echo signals reflected from the focal point and returning to the transducer elements and add up the ultrasound echo signals at the same time.

Meanwhile, the beamformers 281 and 282 may be provided in the ultrasound probe 100. For example, when the ultrasound probe 100 is a wireless probe, the ultrasound probe 100 may include beamformers 281 and 282.

The image processor 290 filters out noise components in a reception beam to improve the image quality of the ultrasound image, performs an envelope detection process for detecting the intensity of the received signal, and generates digital ultrasound image data.

The image processor 290 may perform scan conversion to convert scan lines of the digital ultrasound image data. In addition, the image processor 290 performs image processing on the ultrasound echo signal to generate an A-mode image, a B-mode image, a D-mode image, an E-mode image, an M-mode image, a Doppler image, a 3D ultrasound image and/or 4D ultrasound image.

The image processor 290 performs RGB-processing on the ultrasound image data such that the ultrasound image is displayed on the display 270 and transmits the ultrasound image data to the display 270. In addition, the image processor 290 may perform image processing for including various pieces of additional information on the ultrasound image.

Although the image processor 290 is illustrated as being separated from the controller 300 in FIG. 2, the controller 300 may include the image processor 290.

The display 270 may display the ultrasound image and various types of information processed by the ultrasound imaging apparatus 1. The display 270 may display a graphic user interface capable of adjusting various parameters related to the display of an ultrasound image.

The controller 300 may control the operation of the ultrasound imaging apparatus 1 and the signal flow between internal components of the ultrasound imaging apparatus 1. The controller 300 may include a processor 310 and a memory 320. The controller 300 may be implemented as a processing board in which the processor 310 and the memory 320 are installed on a circuit board. The processor 310 and the memory 320 may be connected through a bus. The processor 310 may be provided in a single unit or in a plurality of units thereof.

The controller 300 may be implemented with a plurality of logic gates or a combination of a general-purpose microprocessor and a memory 320 configured to store a program that may be executed in the microprocessor.

The memory 320 refers to a storage medium that stores program and data required for the operation of each component of the ultrasound imaging apparatus 1. The memory 320 may include high-speed random-access memory, a magnetic disk, an SRAM, a DRAM, a ROM, or the like. In addition, the memory 320 may be detachable from the ultrasound imaging apparatus 1. The memory 320 may include a compact flash (CF) card, a secure digital (SD) card, a smart media (SM) card, a multimedia card (MMC), or a memory stick, but is not limited thereto.

The controller 300 may be electrically connected to each of the PSA board 250, the control panel 260, the display 270, and the beamformers 281 and 282, and may generate a control signal to control components of the probe 100 and the main body 200.

The components included in the ultrasound imaging apparatus 1 are not limited to those shown in FIG. 2, and various components may be combined. Specific operations of the ultrasound imaging apparatus 1 will be described below with reference to FIGS. 5 to 19.

Figure 3:
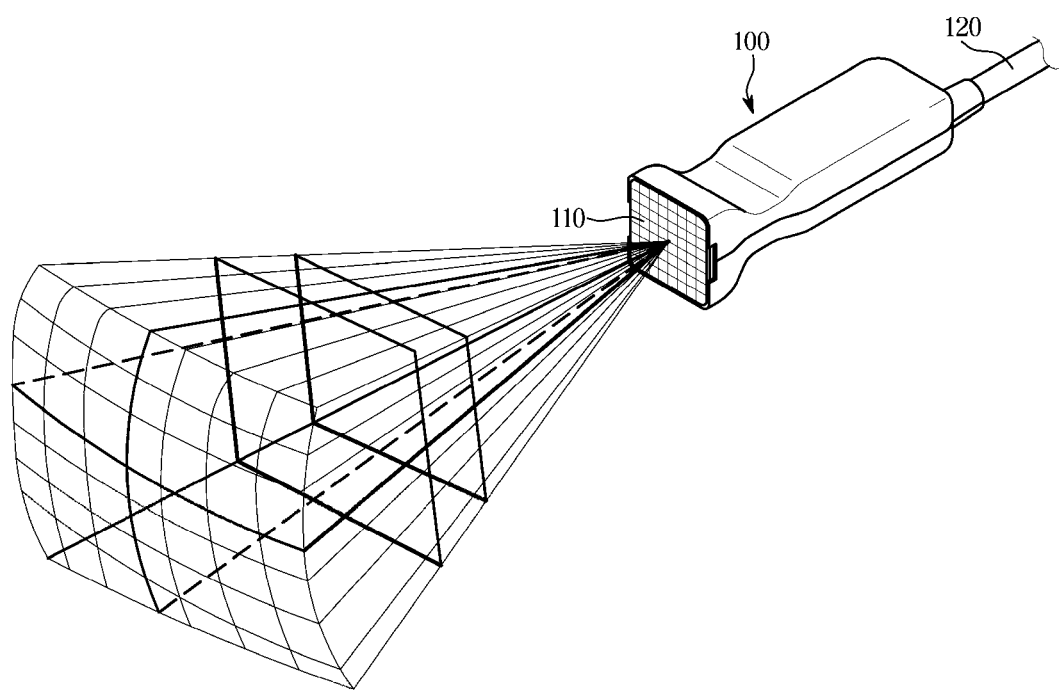
FIG. 3 illustrates an ultrasound probe according to an embodiment.
Figure 4:
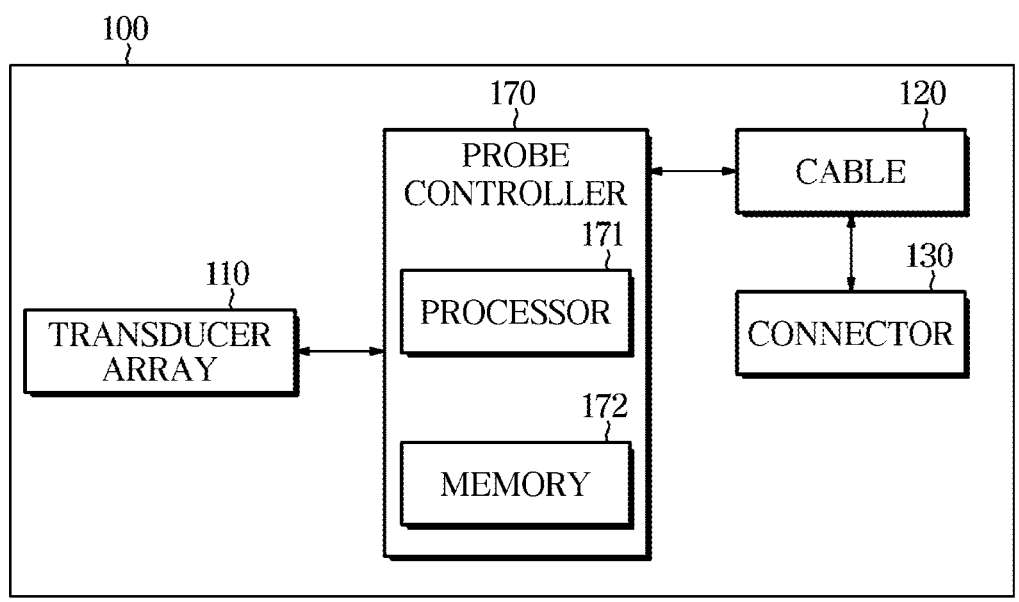
FIG. 4 is a block diagram illustrating the configuration of an ultrasound probe according to an embodiment.

FIG. 3 illustrates an ultrasonic probe according to an embodiment. FIG. 4 is a block diagram illustrating a configuration of an ultrasonic probe according to an embodiment.

Referring to FIGS. 3 and 4, the probe 100 may include a transducer array 110, a cable 120, a connector 130, and a probe controller 170.

As described above, the probe 100 may be a matrix probe. By using the matrix probe, 3D volume data of the target may be obtained, and a 3D ultrasound image and/or a 4D ultrasound image may be obtained. A 4D ultrasound image may represent movement of a three-dimensional image. A two-dimensional cross-sectional image of the target can be obtained. The probe 100 may simultaneously obtain a plurality of cross-sectional images. A plurality of cross-sectional images obtained simultaneously may be defined as a biplane image. The probe 100 is not limited to a matrix probe.

The transducer array 110 is provided at an end of the ultrasound probe 100. The transducer array 110 includes an array of a plurality of ultrasound transducer elements. The transducer array 110 generates ultrasound waves while vibrating by a pulse signal or an alternating current applied by the transmission beamformer 281 of the main body 200. The generated ultrasound is transmitted to a target site inside an object.

The ultrasound generated by the transducer array 110 may be transmitted to a plurality of focuses for a plurality of target sites inside the object. That is, the ultrasound may be multi-focused and transmitted to the plurality of target sites.

The ultrasound transmitted by the transducer array 110 returns to the transducer array 110 as an ultrasound echo signal reflected from the target site inside the object. Upon arrival of the ultrasound echo signal, the transducer array 110 vibrates at a predetermined frequency corresponding to the frequency of the ultrasound echo signal and outputs an alternating current having a frequency corresponding to the vibration frequency. Accordingly, the transducer array 110 may convert the ultrasound echo signal into a predetermined electrical signal.

The transducer elements included in the transducer array 110 may be selectively activated. By selective activation of the transducer elements, the width of the transmission beam may be adjusted and the angle of the transmission beam may be adjusted.

The probe controller 170 may include a processor 171 and a memory 172. The processor 171 of the probe controller 170 may be a general micro-processor, and the memory 172 may store a program that may be executed by the processor 171. The probe controller 170 transmits and receives data into and from the main body 200 and controls the overall operation of the probe 100.

The ultrasound probe 100 may further include a T/R switch and a beamformer. The T/R switch serves as a switch to control the conversion between an operation of the transducer array 110 irradiating the ultrasound signal and an operation of the transducer array 110 receiving the reflected echo signal. Components included in the probe 100 are not limited to those shown in FIG. 4, and may be provided in various combinations.

Figure 5:
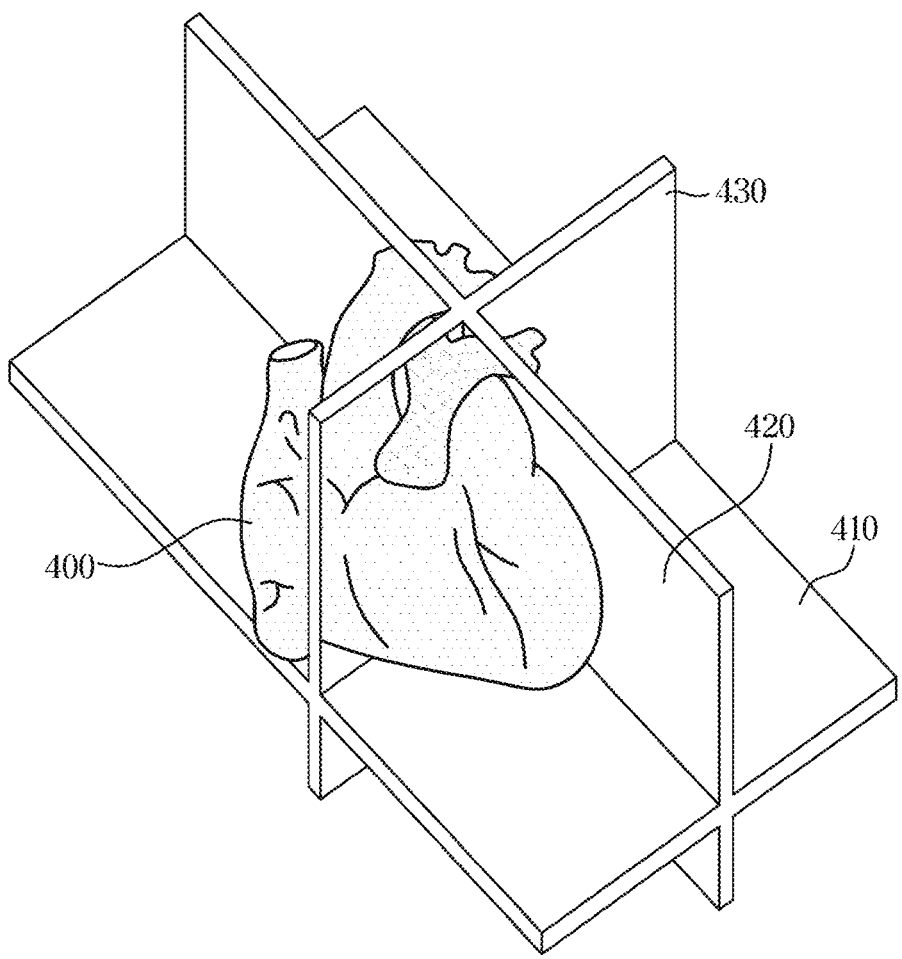
FIG. 5 is a diagram for illustrating a three-dimensional shape and cross section of a heart.

FIG. 5 is a diagram for illustrating a three-dimensional shape and cross section of a heart.

Referring to FIG. 5, the ultrasound imaging apparatus 1 may acquire a three-dimensional image and a cross-sectional image of the heart 400. The ultrasound imaging apparatus 1 may acquire 3D volume data of the heart 400 and generate a 3D ultrasound image and/or a 4D ultrasound image. A 4D ultrasound images can express the movement of three-dimensional images. In otherwords, 3D images are still images, and 4D images are moving images. Therefore, 4D volume data can be understood as a set of 3D volume data acquired along a time axis.

In addition, the ultrasound imaging apparatus 1 may obtain a two-dimensional cross-sectional image of the heart 400. The ultrasound imaging apparatus 1 may simultaneously acquire a plurality of cross-sectional images of the heart 400. A plurality of cross-sectional images acquired at the same time may be defined as a biplane image. The 2D cross-sectional image may be detected from 3D volume data and/or 4D volume data.

For example, the ultrasound imaging apparatus 1 may acquire a cross-sectional image based on each of the horizontal long axis, vertical long axis, and short axis of the heart 400. The axis from the base of the heart 400 to the apex is called a long-axis, and an axis perpendicular to the long axis is called a short-axis. The cross section of the heart 400 obtained along the horizontal long axis may be defined as the horizontal long axis view 410. The cross section of the heart 400 obtained along the vertical long axis may be defined as a vertical long axis view 420. And, the cross section of the heart 400 obtained along the short axis may be defined as the short axis view 430.

In FIG. 5, the horizontal long axis view 410 may be an Apical 4-Chamber (A4C) view. The A4C view is a cross section in which the left ventricle (LV), the left atrium (LA), the right ventricle (RV), and the right atrium (RA) of the heart 400 are represented. The A4C view includes the Apical cap, Apical septum, Mid inferoseptum, Basal inferoseptum, Apical lateral, Mid anterolateral and Basal anterolateral of the heart 400. In the A4C view, the mitral valve, tricuspid valve, cardiac septum, mitral valve, and ventricular septum can be easily observed.

The vertical long axis view 420 may be a Left Ventricular Outflow Tract (LVOT) view. In the LVOT view, the left ventricle (LV), the left atrium (LA), the right ventricle (RV), and the aorta (AO) can be expressed. In the LVOT view, the Left Ventricular Outflow Tract can be easily observed.

The short axis view 430 may be a short axis view at basal level (SAXB). In SAXB, anterior, anteroseptum, inferoseptum, anterior lateral, inferolateral, and inferior of the heart 400 may be observed.

Meanwhile, a standard view of the cross section of the heart 400 may be predefined. For example, in the standard view, the apical 2-chamber (A2C) view, the apical 3-chamber (A3C) view, the apical 4-chamber (A4C) view, the apical 5-chamber (A5C) view, the short axis view at basal level (SAXB), the short axis view at middle level (SAXM), the short axis view at apex level (SAXA), the left ventricular outflow tract (LVOT) view, the right ventricular outflow tract (RVOT) view may be included. The standard view is not limited to being illustrated, and various cross sections may be included.

The controller 300 of the ultrasound imaging apparatus 1 may extract a cross-sectional image from 3D volume data and/or 4D volume data based on a predefined standard view. Detecting a cross-sectional image from 3D volume data and/or 4D volume data using a standard view may improve consistency among users and improve image quality. Detecting the cross-sectional image may be performed using a machine learning program and/or a deep learning program.

Figure 6:
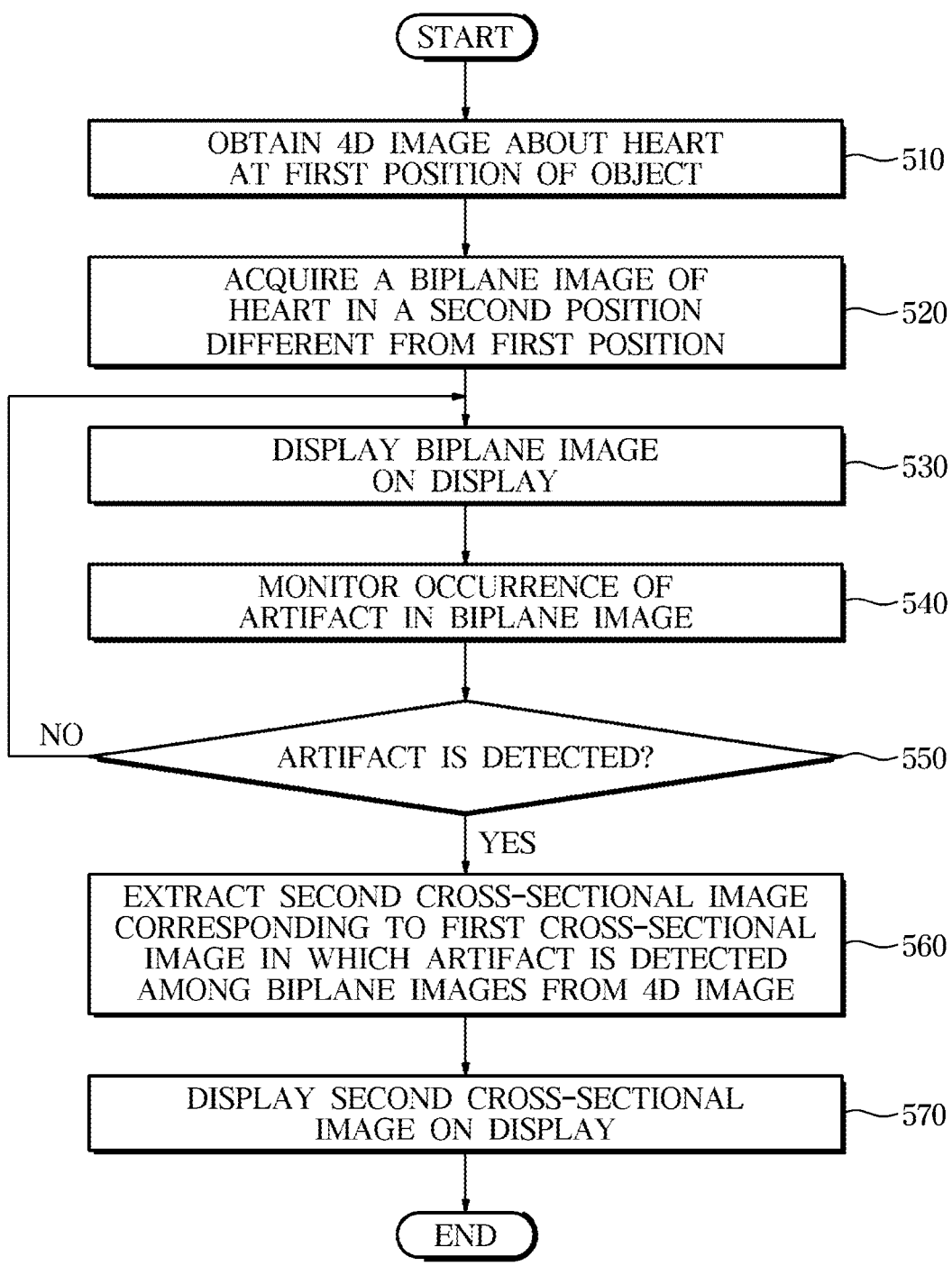
FIG. 6 is a flowchart illustrating a control method of an ultrasound imaging apparatus according to an embodiment.

FIG. 6 is a flowchart illustrating a control method of an ultrasound imaging apparatus according to an embodiment.

First, as described above, the ultrasound imaging apparatus 1 may simultaneously acquire and display multiple cross-sectional images of the heart 400. However, acquiring and displaying multiple cross-sectional images at the same time is not used well because it is inferior in performance to acquiring and displaying 2D images of each cross-section separately.

For example, when trying to acquire an ultrasound image of the heart, artifacts such as a shadow phenomenon may occur due to bone structures such as spine and ribs. In particular, in the case of observing the heart of the fetus, a shadow phenomenon may continue to occur depending on the posture of the fetus moving in the mother's abdomen.

In this case, the experienced user acquired the ultrasound image again at another location of the object where the shadow phenomenon does not occur. When an ultrasound image is acquired at a position where artifacts are not detected, the quality of the image can be ensured. However, it is cumbersome to move the probe every time an artifact occurs and inevitably causes inconvenience.

When acquiring and displaying a biplane image of the heart at an arbitrary position on the object, the disclosed ultrasound imaging apparatus 1 aims to improve the quality of a biplane image by using 4D images acquired from different positions of an object.

Referring to FIG. 6, the controller 300 of the ultrasound imaging apparatus 1 may process the ultrasound echo signal received by the probe 100 and obtain 4D volume data and/or 4D image about the heart 400 at the first position of the object (510). That is, the 4D image must first be acquired by transmitting the ultrasound beam in the first position. The first position of an object may be a position in which artifacts such as shadows are not detected. The 4D image acquired in the first position may be defined as a first 4D image.

The controller 300 may acquire a biplane image of the heart 400 in a second position different from the first position (520). That is, the controller 300 may obtain a biplane image by processing the ultrasound echo signal received by the probe 100 at the second position of the object.

The biplane image may include two 2D cross-sectional images. For example, the biplane image may include an image of the apical 4-chamber (A4C) view and the image of the left ventricular outflow tract (LVOT) view. The biplane image may be acquired from 4D image and/or 4D volume data acquired in the second position. The 4D image acquired in the second position may be defined as a second 4D image.

The controller 300 may control the display 270 to display the acquired biplane image (530). The biplane image may be simultaneously displayed on the display 270.

In addition, the controller 300 may monitor occurrence of an artifact in the biplane image (540). Specifically, the controller 300 may detect and/or identify a shadow in a biplane image displayed on the display 270. The detection of the shadow may be performed using a machine learning program and/or a deep learning program. The artifacts are defined as including various image quality degradation in addition to shadows.

When an artifact is detected in the biplane image (550), the controller 300 may extract a second cross-sectional image corresponding to the first cross-sectional image in which the artifact is detected among the biplane images from the 4D image (560). For example, a shadow may be detected in the image of the LVOT view among the image of the A4C view and the image of the LVOT view acquired at the second position of the object. In this case, the image of the LVOT view is defined as the first cross-sectional image. The 4D image from which the second cross-sectional image is extracted (the first 4D image) is obtained at the first position.

The controller 300 may control the display 270 to display the second cross-sectional image (570). The second cross-sectional image may be displayed together with the first cross-sectional image (independently and simultaneously), may be displayed in place of the first cross-sectional image, or may be displayed overlaid on the first cross-sectional image.

In this way, when a cross-sectional image including an artifact is detected in the biplane image, by extracting and displaying other cross-sectional images that do not contain artifacts for the same cross-section, the overall quality related to the display of the biplane image can be improved.

Figure 7:
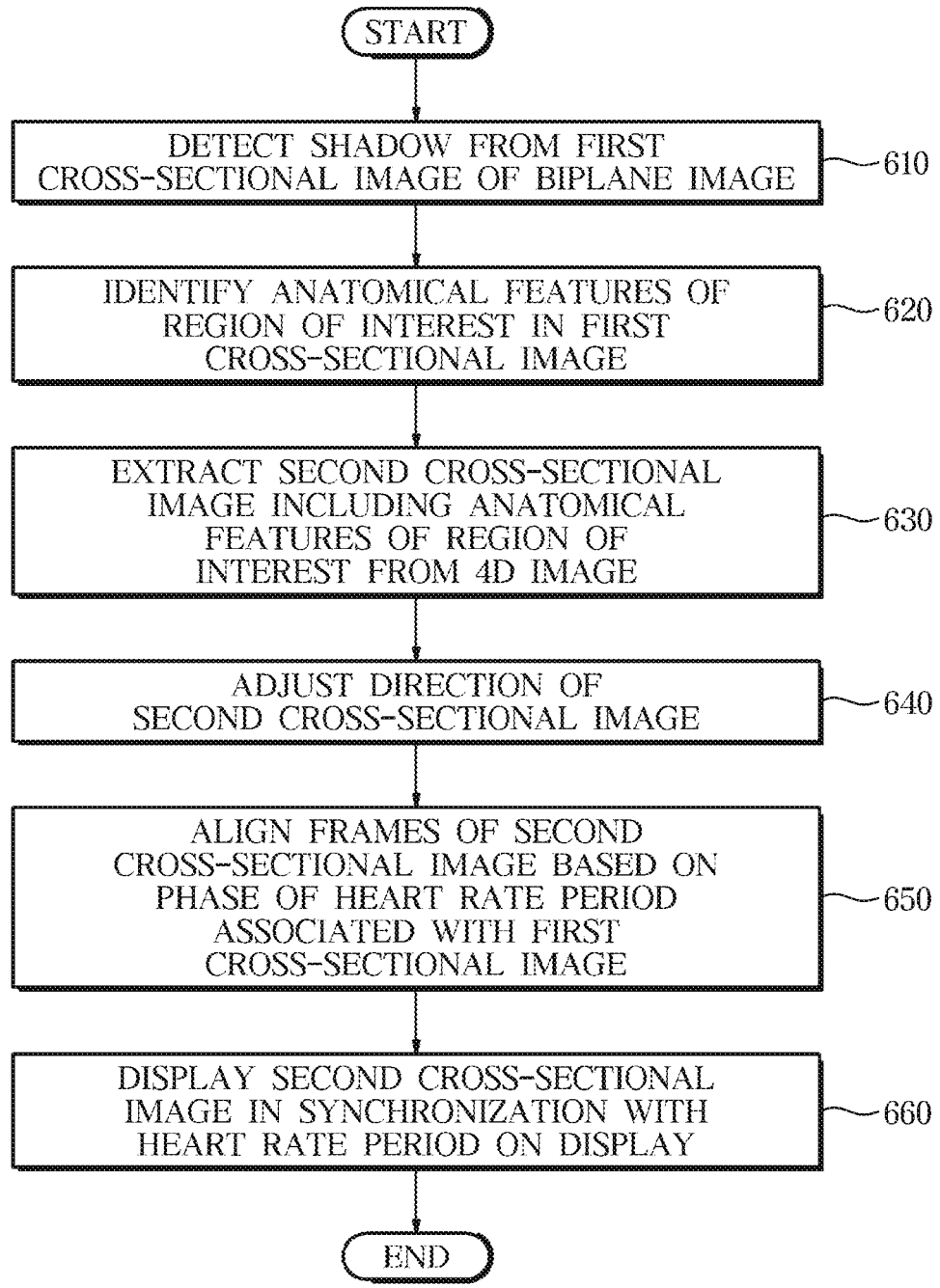
FIG. 7 is a flow chart illustrating in more detail a control method of an ultrasound imaging apparatus according to an embodiment.

FIG. 7 is a flow chart illustrating in more detail a control method of an ultrasound imaging apparatus according to an embodiment.

Referring to FIG. 7, the controller 300 may detect a shadow from a first cross-sectional image of a biplane image (610). In FIG. 7, before process 610, processes 510, 520, 530 and 540 of FIG. 6 are performed first.

The controller 300 may extract a second cross-sectional image corresponding to the first cross-sectional image in which the artifact is detected among the biplane images from the 4D image (first 4D image). The following processes can be performed to extract the second cross-sectional image.

The controller 300 may identify anatomical features of the region of interest in the first cross-sectional image (620). The anatomical feature of a region of interest may include the shape, size and position of the region of interest. For example, the region of interest may be set to include the left ventricle LV and the aorta AO. In this case, the controller 300 may identify the shape, size, and position of the left ventricle LV and the aorta AO in the first cross-sectional image.

Since the heart 400 moves rapidly, characteristics appearing in the cross-sectional image may change over time even if the cross-section is in the same direction. Thus, the first cross-sectional image may be composed of a plurality of frames related to the same cross-section of the heart 400.

The controller 300 may identify an anatomical feature of a region of interest in each of the frames of the first cross-sectional image.

The controller 300 may extract a second cross-sectional image including anatomical features of a region of interest within the first cross-sectional image from a 4D image (first 4D image) (630). In other words, the controller 300 may extract a second cross-sectional image including the same feature as the anatomical feature of the region of interest in the first cross-sectional image. The controller 300 may extract frames of the second cross-sectional image corresponding to the frames of the first cross-sectional image from the 4D image (first 4D image).

The cross section of the heart shown in the second cross-sectional image may be the same as the cross section of the heart shown in the first cross-sectional image. However, the cross-section of the heart shown in the second cross-sectional image is not necessarily the same as the cross-section of the heart shown in the first cross-sectional image.

Also, the controller 300 may extract a second cross-sectional image from the 4D image based on a predefined standard view. For example, LVOT view can be included in standard view. In this case, the controller 300 may extract the image of the LVOT view from the 4D image and/or the 4D volume data as a second cross-sectional image. Accordingly, the first cross-sectional image and the second cross-sectional image may represent the same cross-section of the heart 400.

The controller 300 may adjust the direction of the second cross-sectional image to match the direction of the first cross-sectional image (640). The direction of the second cross-sectional image extracted from the 4D volume data obtained at the first position of the object may be different from the direction of the first cross-sectional image of the biplane image obtained at the second position of the object. Therefore, it is necessary to match the direction of the first cross-sectional image and the direction of the second cross-sectional image. To this end, the controller 300 may identify the direction of the first cross-sectional image and the direction of the second cross-sectional image. The controller 300 may control the display 270 to display a second cross-sectional image whose direction has been adjusted.

The controller 300 may align the frames of the second cross-sectional image based on the phase of the heart rate period associated with the first cross-sectional image (650). This is to match the timing at which the second cross-sectional image is displayed with the timing at which the first cross-sectional image is displayed.

Since the heart 400 moves rapidly, characteristics appearing in the cross-sectional image may change over time even if the cross-section is in the same direction. Changes in features appearing on the cross-sectional image of the heart are repeated periodically along the heart rate period. The frame rate of the first cross-sectional image included in the biplane image and the frame rate of the second cross-sectional image obtained from the 4D image may be different. In this case, the phase of the heart rate period associated with each of the frames of the first cross-sectional image and the phase of the heart rate period associated with each of the frames of the second cross-sectional image may be different. Therefore, it is necessary to align the frames of the second cross-sectional image based on the phase of the heart rate period associated with the first cross-sectional image.

The controller 300 may control the display 270 to display the second cross-sectional image in synchronization with the heart rate period (660).

Meanwhile, the controller 300 may perform frame interpolation to match the temporal resolution of the first cross-sectional image 1000 and the second cross-sectional image 1100 and 1200. The temporal resolution means the frame rate. For example, frame interpolation for the second cross-sectional images 1100 and 1200 may be performed to increase the frame rate of the second cross-sectional images 1100 and 1200.

In addition, the controller 300 may perform spatial resolution interpolation to match the spatial resolutions of the first cross-sectional image 1000 and the second cross-sectional images 1100 and 1200. Spatial resolution is a criterion of how detailed an image can be expressed in a spatial domain. In other words, spatial resolution can be understood as screen resolution. For interpolation of spatial resolution, a Super Resolution technique may be used. For example, the number of pixels in the first cross-sectional image 1000 may be greater than the number of pixels in the second cross-sectional images 1100 and 1200. Conversely, the number of pixels in the second cross-sectional image 1100 and 1200 may be greater than the number of pixels in the first cross-sectional image 1000. In this case, the controller 300 may perform spatial resolution interpolation of at least one of the first cross-sectional image 1000 and the second cross-sectional image 1100 and 1200.

Figure 8:
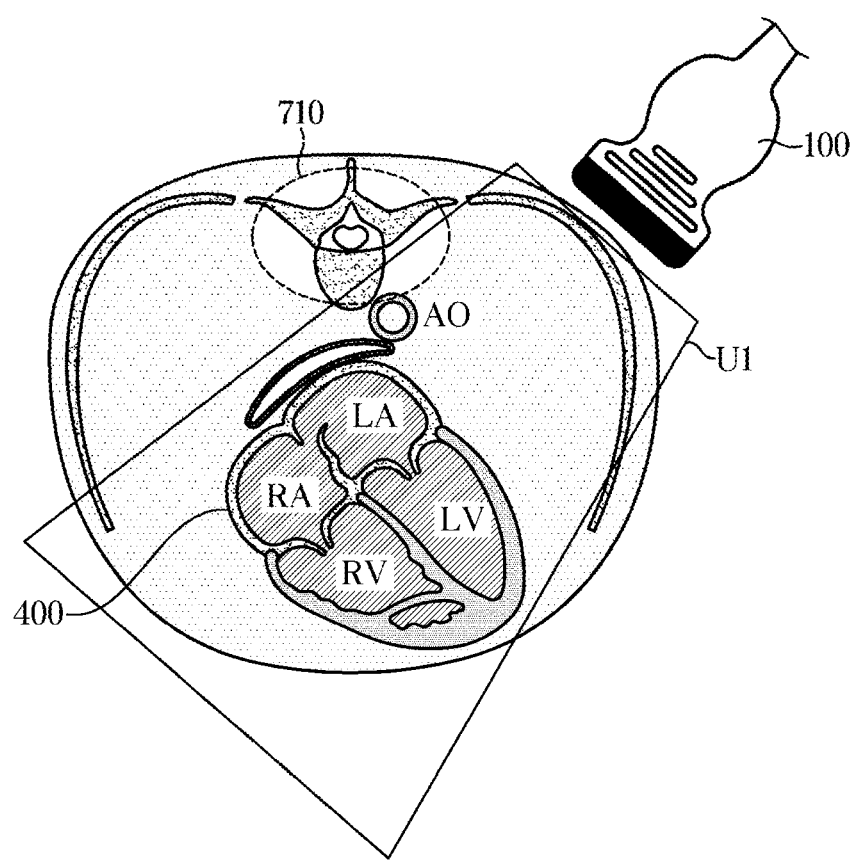
FIG. 8 illustrates a method of obtaining a 4D image of a heart in a first position of an object.

FIG. 8 illustrates a method of obtaining a 4D image of a heart in a first position of an object.

Referring to FIG. 8, the probe 100 transmits a first ultrasound beam U1 to a target heart 400 at a first position of an object, and receives an ultrasound echo signal. The controller 300 of the ultrasound imaging apparatus 1 may process the ultrasound echo signal received by the probe 100 and obtain 4D volume data and/or 4D image about the heart 400 at the first position of the object. In addition, the 4D image and/or the 4D volume data acquired at the first position of the object is stored in the memory 320.

The first position of an object may be a position where artifacts such as shadows are not detected in the ultrasound image. For example, as shown in FIG. 8, the first position of the object may be a side of the spine 710 and a position between the ribs. Since the first ultrasound beam U1 is not covered by the spine 710, the 4D image and/or 4D volume data acquired at the first position of the object may not include artifacts such as shadows. The 4D image acquired in the first position may be defined as a first 4D image.

Figure 9:
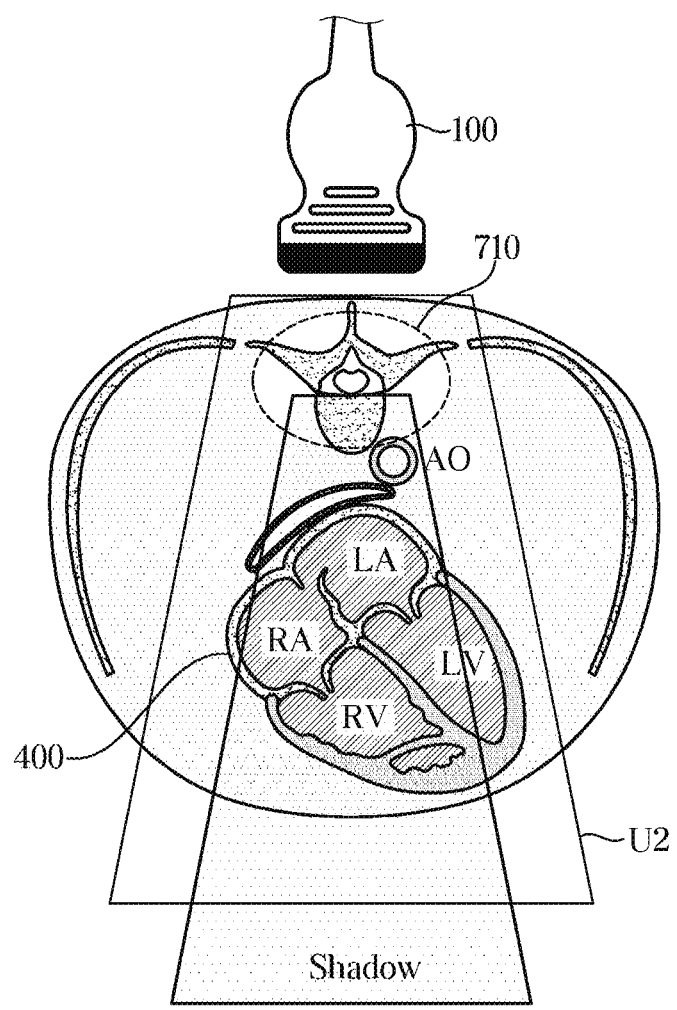
FIG. 9 illustrates a method of obtaining a biplane image of a heart in a second position of an object.

FIG. 9 illustrates a method of obtaining a biplane image of a heart in a second position of an object.

Referring to FIG. 9, the controller 300 may acquire a biplane image of the heart 400 in a second position different from the first position. The probe 100 transmits the second ultrasound beam U2 at the second position of the object to the target heart 400 and receives an ultrasound echo signal. The controller 300 may obtain a biplane image by processing the ultrasound echo signal received by the probe 100 at the second position of the object. The biplane image may be acquired from 4D image and/or 4D volume data acquired in the second position. The 4D image acquired in the second position may be defined as a second 4D image. Further, the biplane image, the second 4D image, and/or the second 4D volume data acquired at the second position of the object may be stored in the memory 320.

The second position of the object may be a position at which an artifact such as the shadow 720 can be detected in the ultrasound image. For example, as shown in FIG. 9, the second position of the object may be a position where the second ultrasound beam U2 is covered by the spine 710. Since the second ultrasound beam U2 is covered by the spine 710, the ultrasound image acquired at the second position of the object may include artifacts such as the shadow 720. Therefore, the heart 400 may not be properly observed in the ultrasound image.

Figure 10:
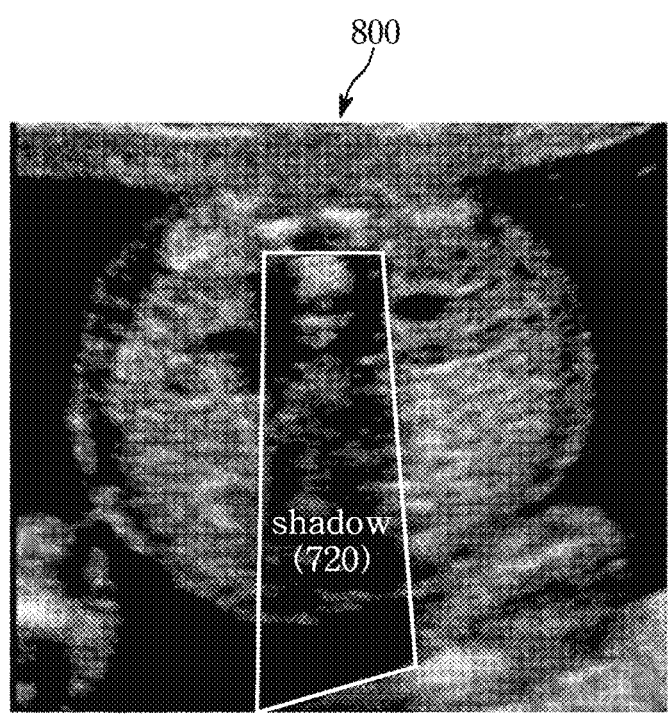
FIG. 10 illustrates an example of a cross-sectional image including artifacts.

FIG. 10 illustrates an example of a cross-sectional image including artifacts.

Referring to FIG. 10, it is confirmed that a shadow 720, which is an artifact, is included in the ultrasound cross-sectional image 800. The ultrasound cross-sectional image 800 is an actual ultrasound image related to the schematic diagram of FIG. 9. As described in FIG. 9, since the ultrasound beam is covered by the spine 710, the ultrasound cross-sectional image 800 may include artifacts such as the shadow 720. Therefore, the heart 400 may not be properly observed in the ultrasound image.

FIG. 11 illustrates an apical 4-chamber view as an example of a cross-sectional image constituting a biplane image. FIG. 12 illustrates a left ventricular outflow tract view (LVOT view) including artifacts as an example of a cross-sectional image constituting a biplane image. FIG. 13 illustrates an example in which the biplane images of FIGS. 11 and 12 are displayed on a display of an ultrasound imaging apparatus.

The ultrasound imaging apparatus 1 may simultaneously acquire a plurality of cross-sectional images of the heart 400. A plurality of cross-sectional images acquired at the same time may be defined as a biplane image. The biplane image can be acquired at the second position of the object. The biplane images described in FIGS. 11 and 12 are acquired at a position of an object different from the second position of FIG. 9. In FIG. 9, the front surface of the transducer array 110 transmits an ultrasound beam toward the spine 710. However, in FIGS. 11 and 12, only a part of the transducer array 110 transmits an ultrasound beam toward the spine 710, and the ultrasound beam transmitted by another part of the transducer array 110 is not directed toward the spine 710.

Referring to FIG. 11, one of the cross-sectional images included in the biplane image is an image of a horizontal long axis view 410 and may be an image 900 of an A4C view. As described in FIG. 5, in an image 900 of an A4C view, a left ventricle LV, a left atrium LA, a right ventricle RV, and a right atrium RA may be observed. The shadow may not be detected in the image 900 of the A4C view.

Referring to FIG. 12, another one of the cross-sectional images included in the biplane image is an image of a vertical long axis view 420 and may be an image 1000 of LVOT view. As described in FIG. 5, in the image 1000 of the LVOT view, the left ventricle LV, the left atrium LA, the right ventricle RV, and the aorta AO can be observed. In addition, in the image 1000 of the LVOT view, a left ventricular outflow tract can be easily observed.

As illustrated in FIG. 12, the region of interest (ROI) may be set to include the left ventricle LV and the aorta AO. However, since a part of the ultrasound beam is transmitted toward the spine 710, a shadow may be detected in the image 1000 of the LVOT view. Therefore, the structure of the heart 400 may not be clearly identified. The image 1000 of the LVOT view in which the shadow is detected may be determined as a first cross-sectional image.

Referring to FIG. 13, the controller 300 of the ultrasound imaging apparatus 1 may control the display 270 to display a biplane image. For example, the controller 300 may control the second display 270-2 of the displays 270 to simultaneously display the image 900 of the A4C view and the image 1000 of the LVOT view. However, since artifacts exist in the image 1000 of the LVOT view, that is, the first cross-sectional image 1000, it is difficult to make a desirable observation of the heart 400.

A desirable observation of the heart 400 may be possible through acquisition of another cross-sectional image corresponding to the first cross-sectional image 1000 and not including artifacts. As a result, the quality of the biplane image can be improved.

Figure 14:
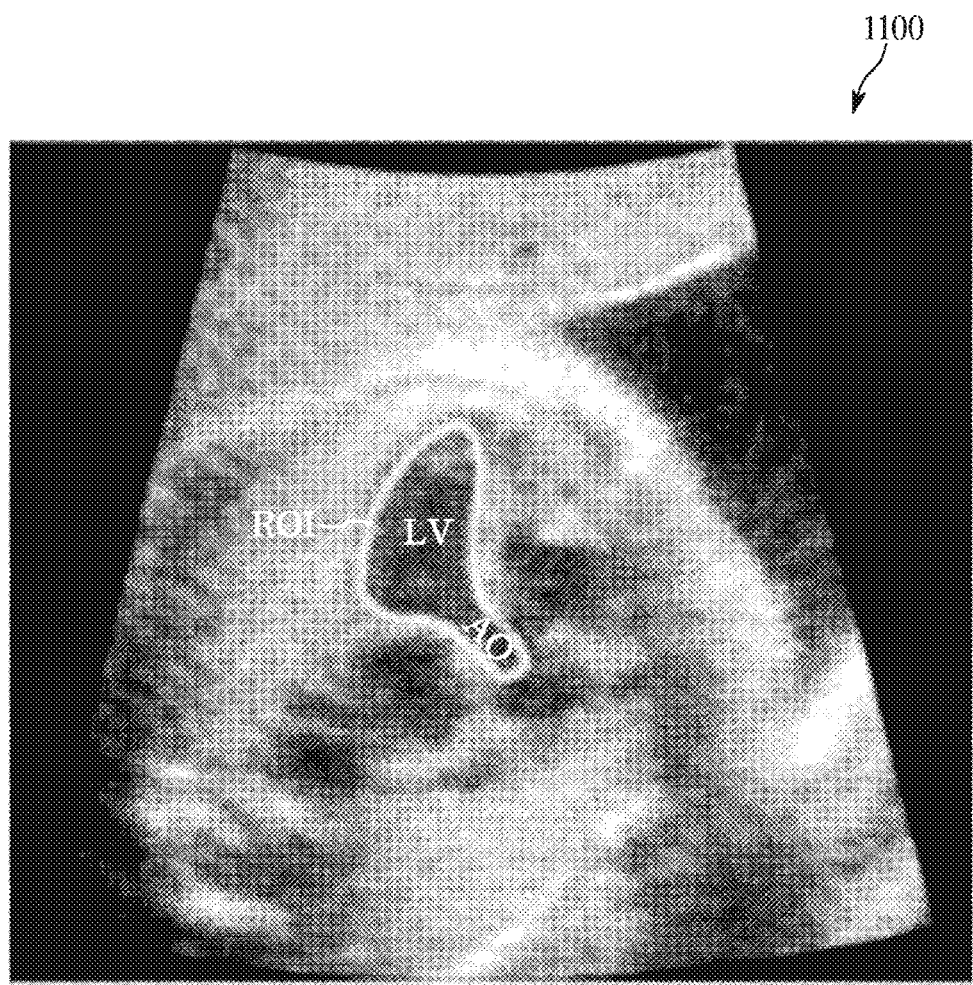
FIG. 14 illustrates an example of a second cross-sectional image extracted from the 4D image of FIG. 8.

FIG. 14 illustrates an example of a second cross-sectional image extracted from the 4D image of FIG. 8.

Referring to FIG. 14, the controller 300 of the ultrasound imaging apparatus 1 may extract a second cross-sectional image 1100 corresponding to the first cross-sectional image 1000 in which an artifact is detected from a 4D image (first 4D image).

As described in FIG. 7, for extraction of the second cross-sectional image 1100, the controller 300 may identify anatomical features of a region of interest (ROI) in the first cross-sectional image 1000. The controller 300 may identify the shape, size, and position of the left ventricle LV and the aorta AO in the first cross-sectional image 1000. The controller 300 may identify an anatomical feature of a region of interest in each of the frames of the first cross-sectional image 1000.

The controller 300 may extract a second cross-sectional image 1100 including an anatomical feature of a region of interest (ROI) within the first cross-sectional image 1000 from a 4D image (a first 4D image). The controller 300 may extract frames of the second cross-sectional image 1100 corresponding to the frames of the first cross-sectional image 1000 from a 4D image (first 4D image).

The cross-section of the heart shown in the second cross-sectional image 1100 may be the same as the cross-section of the heart shown in the first cross-sectional image 1000. In FIG. 14, the cross-section of the heart shown in the second cross-sectional image 1100 is an LVOT view.

Figure 15:
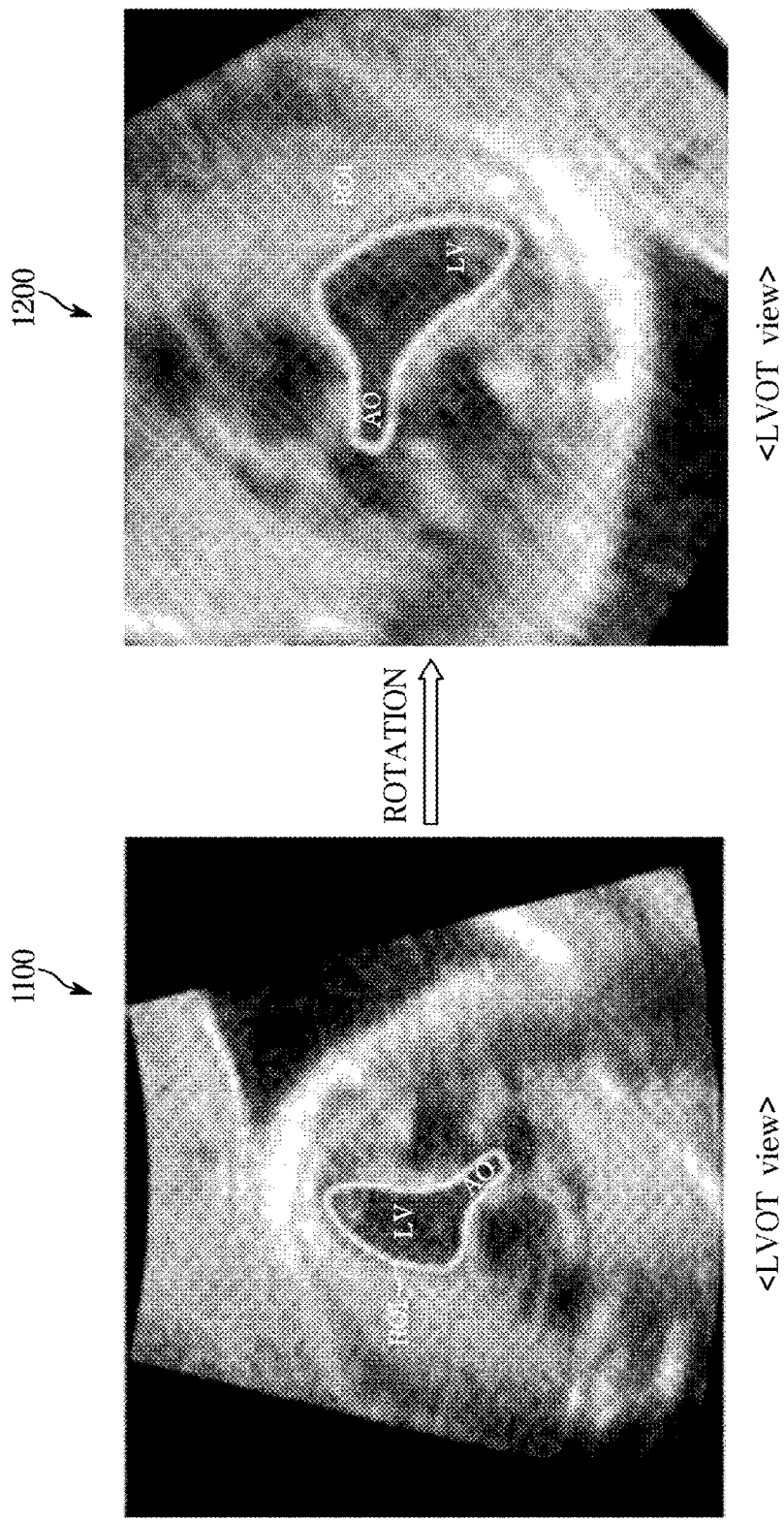
FIG. 15 illustrates that the second cross-sectional image of FIG. 14 is converted.

FIG. 15 illustrates that the second cross-sectional image of FIG. 14 is converted.

Referring to FIG. 15, the controller 300 may adjust the direction of the second cross-sectional image to match the direction of the first cross-sectional image. The direction of the second cross-sectional image 1100 extracted from the 4D volume data acquired at the first position of the object may be different from the direction of the first cross-sectional image 1000 of the biplane image acquired at the second position of the object. Specifically, the direction of the region of interest shown in the first cross-sectional image 1000 may be different from the direction of the region of interest shown in the second cross-sectional image 1100. In this case, it is necessary to align the direction of the first cross-sectional image 1000 and the direction of the second cross-sectional image 1100 for ease of observation.

To this end, the controller 300 may identify the direction of the first cross-sectional image 1000 and the direction of the second cross-sectional image 1100 and adjust the direction of the second cross-sectional image 1100. In FIG. 15, the controller 300 rotates the second cross-sectional image 1100 to match the direction of the second cross-sectional image 1100 with the direction of the first cross-sectional image 1000.

The controller 300 may control the display 270 to display the second cross-sectional image 1200 whose direction is adjusted.

Figure 16:
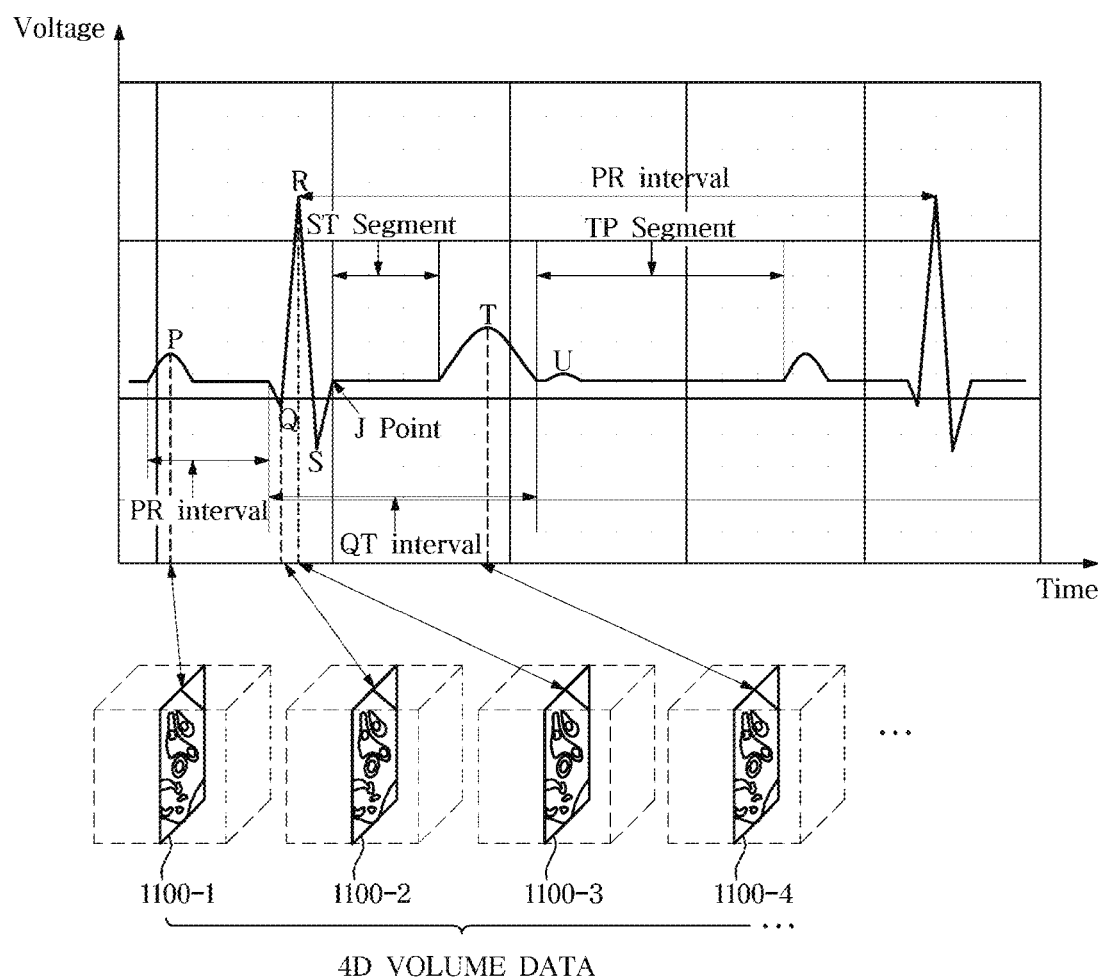
FIG. 16 illustrates that frames of the second cross-sectional image are aligned based on the phase of the heart rate period.

FIG. 16 illustrates that frames of the second cross-sectional image are aligned based on the phase of the heart rate period.

Referring to FIG. 16, the controller 300 may align frames of the second cross-sectional image 1100 based on the phase of the heart rate period associated with the first cross-sectional image. This is to match the timing at which the second cross-sectional image is displayed with the timing at which the first cross-sectional image is displayed.

Since the heart 400 moves rapidly, characteristics appearing in the cross-sectional image may change over time even if the cross-section is in the same direction. Changes in features appearing on the cross-sectional image of the heart are repeated periodically along the heart rate period. The frame rate of the first cross-sectional image 1000 included in the biplane image and the frame rate of the second cross-sectional image 1100 obtained from the 4D image may be different. For example, the frame rate of the first cross-sectional image 1000 may be greater than the frame rate of the second cross-sectional image 1100.

In this case, the phase of the heart rate period associated with each of the frames of the first cross-sectional image 1000 and the phase of the heart rate period associated with each of the frames 1100-1, 1100-2, 1100-3 and 1100-4 of the second cross-sectional image may be different. Therefore, it is necessary to align the frames 1100-1, 1100-2, 1100-3 and 1100-4 of the second cross-sectional image 1100 based on the phase of the heart rate period associated with the first cross-sectional image 1000. For example, the frames 1100-1, 1100-2, 1100-3, and 1100-4 of the second cross-sectional image 1100 may be aligned so as to be synchronized with each of the P phase, Q phase, R phase, and T phase of the Electro Cardio Graph (ECG).

The controller 300 may control the display 270 to display the second cross-sectional image 1100 in synchronization with the heart rate period. The display 270 may display a second cross-sectional image 1200 whose direction has been adjusted.

Meanwhile, the controller 300 may perform frame interpolation to match the temporal resolution of the first cross-sectional image 1000 and the second cross-sectional image 1100 and 1200. The temporal resolution means the frame rate. For example, frame interpolation for the second cross-sectional images 1100 and 1200 may be performed to increase the frame rate of the second cross-sectional images 1100 and 1200.

In addition, the controller 300 may perform spatial resolution interpolation to match the spatial resolutions of the first cross-sectional image 1000 and the second cross-sectional images 1100 and 1200. Spatial resolution is a criterion of how detailed an image can be expressed in a spatial domain. In other words, spatial resolution can be understood as screen resolution. For interpolation of spatial resolution, a Super Resolution technique may be used. For example, the number of pixels in the first cross-sectional image 1000 may be greater than the number of pixels in the second cross-sectional images 1100 and 1200. Conversely, the number of pixels in the second cross-sectional image 1100 and 1200 may be greater than the number of pixels in the first cross-sectional image 1000. In this case, the controller 300 may perform spatial resolution interpolation of at least one of the first cross-sectional image 1000 and the second cross-sectional image 1100 and 1200.

Figure 17:
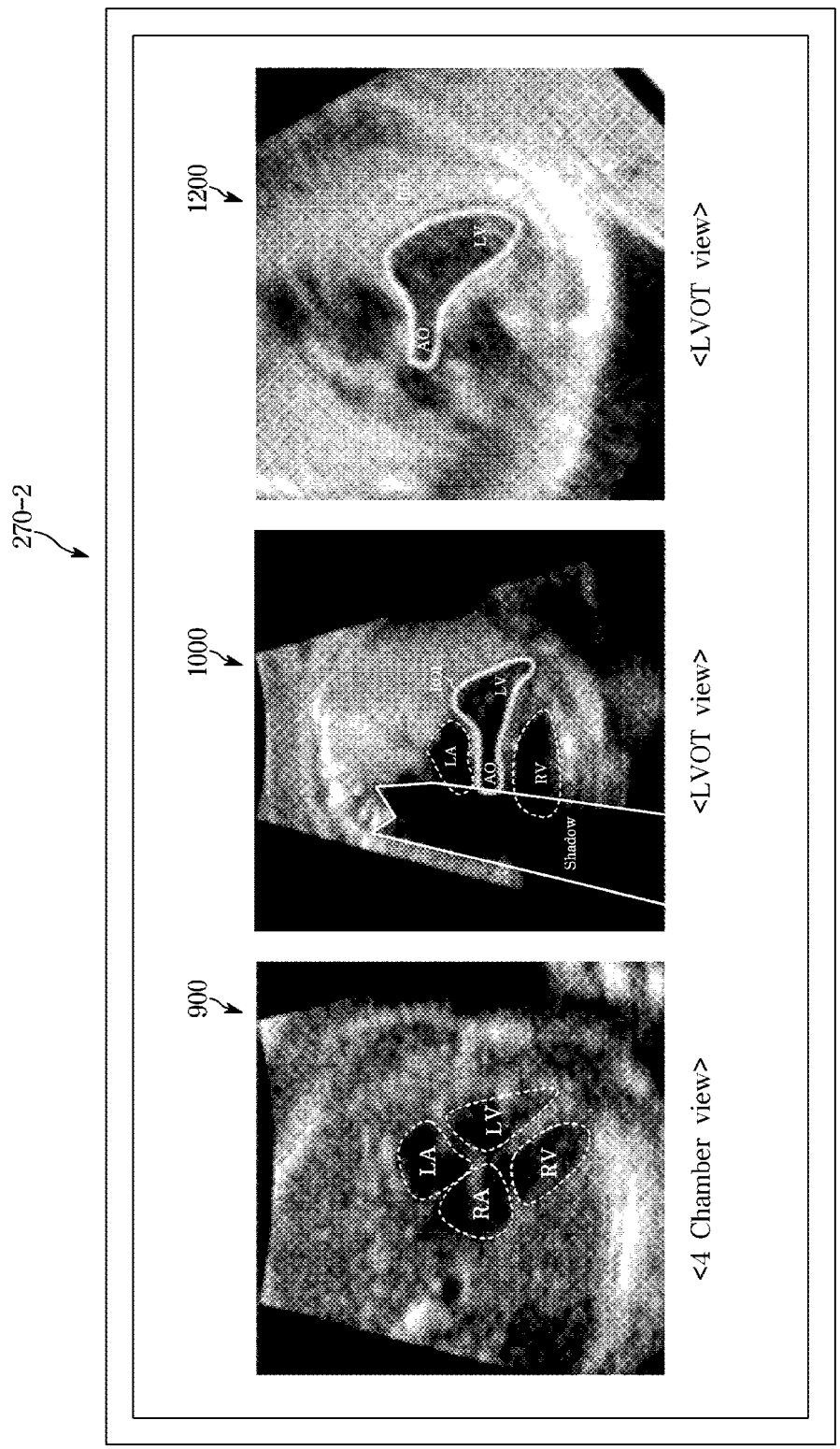
FIGS. 17 to 19 illustrate embodiments in which an improved biplane image is displayed on a display of an ultrasound imaging apparatus.
Figure 18:
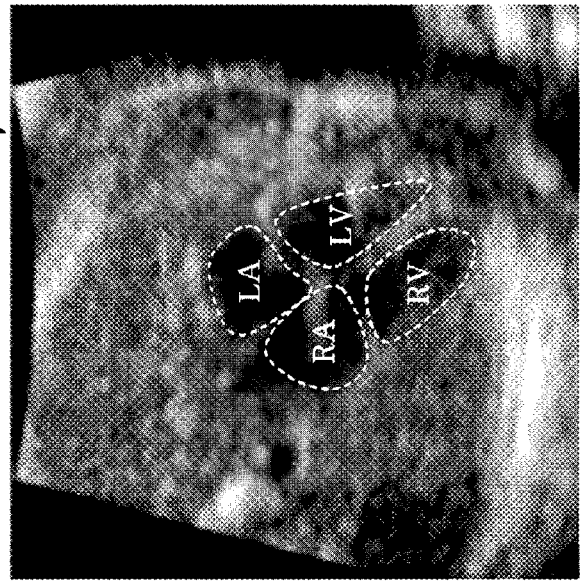
Figure 19:
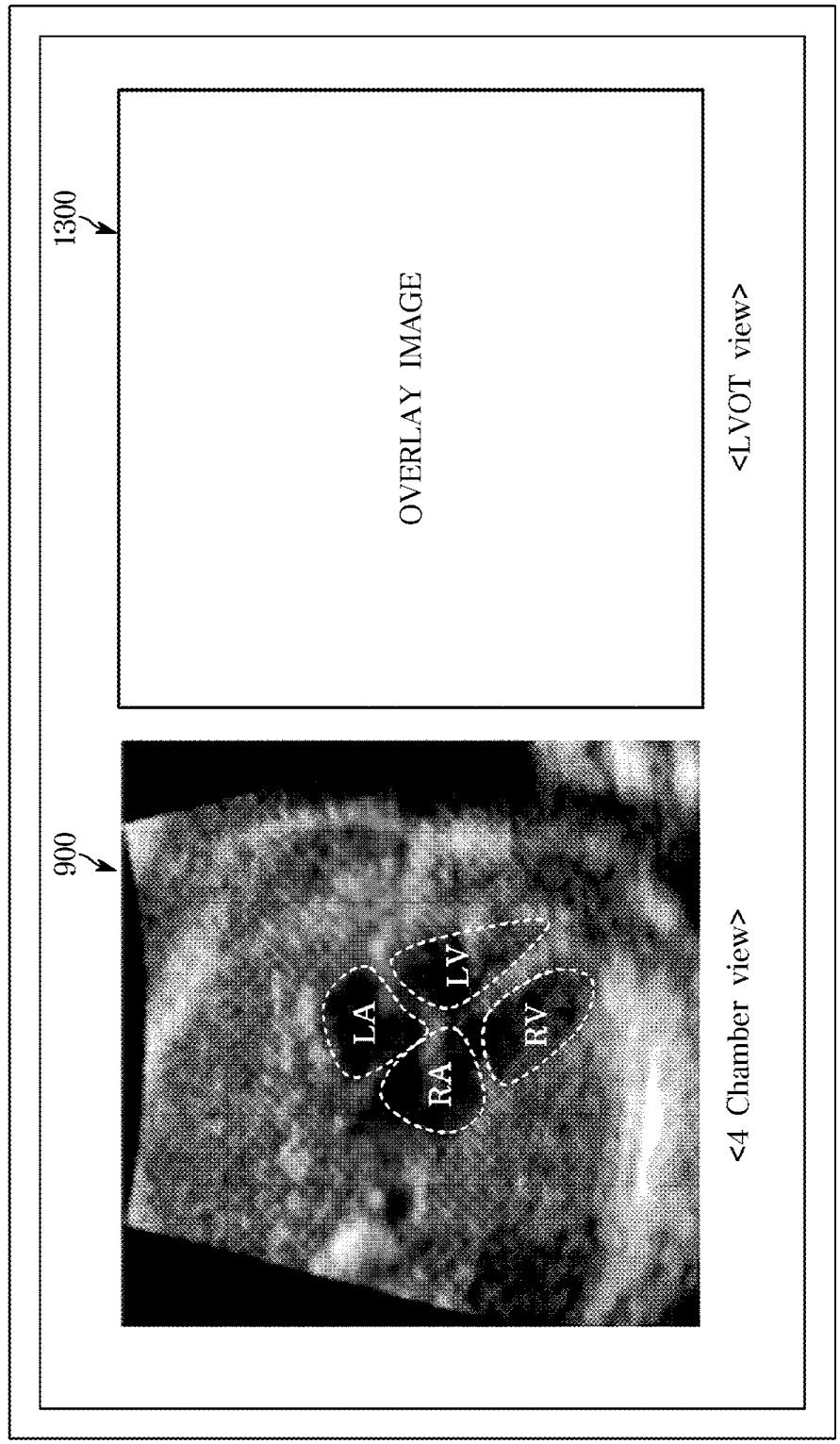

FIGS. 17 to 19 illustrate embodiments in which an improved biplane image is displayed on a display of an ultrasound imaging apparatus.

FIGS. 17 to 19 illustrate that an ultrasound image is displayed on the second display 270-2, the ultrasound image may be displayed on the first display 270-1.

Referring to FIG. 17, the controller 300 of the ultrasound imaging apparatus 1 may control the display 270 to simultaneously display the biplane images 900 including the first cross-sectional image 1000 including artifacts and the second cross-sectional image 1200. In other words, the controller 300 may control the display 270 to display the second cross-sectional image 1200 together with the first cross-sectional image 1000 (independently and simultaneously).

As shown in FIG. 17, the ultrasound imaging apparatus 1 may enable a desirable observation of the heart 400 by independently simultaneously displaying a first cross-sectional image 1000 including artifacts and a second cross-sectional image 1200 not including artifacts for the same cross-section.

Referring to FIG. 18, the controller 300 may control the display 270 to display by replacing the first cross-sectional image 1000 including the artifacts with the second cross-sectional image 1200 that does not include the artifacts. In this case, on the second display 270-2, the A4C view image 900 which is one of the biplane images acquired at a current position (second position) of the probe 100 and the second cross-sectional image 1200 may be displayed.

Referring to FIG. 19, the controller 300 may control the display 270 to overlay and display the second cross-sectional image 1200 that does not include the artifact on the first cross-sectional image 1000 including the artifact. In this case, on the second display 270-2, an image 900 of an A4C view and an overlay image 1300 of an LVOT view may be displayed as a biplane image acquired at the current position (second position) of the probe 100.

Meanwhile, the display form of the biplane image may be determined based on a user's input. The user may select any one of the display forms of the biplane image shown in FIGS. 17 to 19 by manipulating the control panel 260.

In this way, when an artifact exists in the biplane image acquired at the current position of the probe 100, the ultrasound imaging apparatus 1 may additionally and/or alternatively display a second cross-sectional image 1200 that does not contain artifacts, thereby enabling desirable observation of the heart 400.

In addition, when an artifact such as a shadow is seen in the biplane image, the user can perform diagnosis through an added cross-sectional image and/or a replaced cross-sectional image without moving the position of the probe. Therefore, convenience is increased and faster diagnosis is possible.

As described above, the disclosed ultrasound imaging apparatus and control method thereof can improve the quality of a biplane image by using a 4D image acquired from another position of the object when displaying a biplane image about a target in an object at an arbitrary position of the object.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments.

In addition, the device-readable recording medium may be provided in the form of a non-transitory storage medium. Here, 'non-transitory storage medium' is a tangible device and only means that it does not contain a signal (e.g., electromagnetic wave). This term does not distinguish between a case where data is stored semi-permanently in a storage medium and a case that is temporarily stored. For example, the 'non-transitory storage medium' may include a buffer in which data is temporarily stored.

According to an embodiment, a method according to various embodiments disclosed in the present document may be provided by being included in a computer program product. Computer program products may be traded between sellers and buyers as commodities. Computer program products are distributed in the form of a device-readable recording medium (e.g. compact disc read only memory (CD-ROM)), or may be distributed (eg, downloaded or uploaded) through an application store (eg, Play Store™) or directly or online between two user devices (eg, smartphones). In the case of online distribution, at least a portion of the computer program product (e.g., downloadable app) is at least temporarily stored in a device-readable recording medium such as the manufacturer's server, the application store's server, or the relay server's memory, or may temporarily be generated.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

The disclosed ultrasound imaging apparatus and control method thereof can improve the quality of a biplane image by using a 4D image acquired from another position of the object when displaying a biplane image about a target in an object at an arbitrary position of the object.

What is claimed is:

1. An ultrasound imaging apparatus comprising:
   a display configured to display an ultrasound image;
   an ultrasound probe configured to transmit an ultrasound signal and receive an ultrasound echo signal at a first position of an object and at a second position of the object; and
   a controller configured to:
      process the ultrasound echo signal at the first position and obtain a first 4D image of a heart, wherein the first position is located at a side of the spine and between the ribs,
      process the ultrasound echo signal at the second position and obtain a second 4D image of the heart, wherein the spine or the ribs cover the heart at the second position,
      obtain a biplane image from the second 4D image, wherein the biplane image includes a plurality of cross-sectional images acquired simultaneously from the second 4D image,
      control the display to display the biplane image in real-time, while the ultrasound probe is positioned at the second position,
      monitor the displayed biplane image to identify the occurrence of an artifact by detecting shadows caused by the spine or the ribs in the displayed biplane image,
      select a first cross-sectional image in which the artifact is detected among the plurality of cross-sectional images of the biplane image in response to detection of the artifact, wherein the first cross-sectional image includes a region of interest,
      identify an anatomical feature within the region of interest, wherein the anatomical feature includes a shape, size and position within the region of interest,
      select a second cross-sectional image from the first 4D image, wherein the second cross-sectional image corresponds to the first cross-sectional image and includes the identified anatomical feature, and
      control the display to simultaneously display the biplane image and the second cross-sectional image in place of the first cross-sectional image.

2. The ultrasound imaging apparatus of claim 1, wherein the controller is configured to control the display to simultaneously display the biplane image comprising the first cross-sectional image and the second cross-sectional image.

3. The ultrasound imaging apparatus of claim 1, wherein the controller is configured to control the display to display by overlaying the second cross-sectional image on the first cross-sectional image.

4. The ultrasound imaging apparatus of claim 1, wherein the controller is configured to select the second cross-sectional image from the first 4D image based on a predefined standard view.

5. The ultrasound imaging apparatus of claim 1, wherein the controller is configured to adjust a direction of the second cross-sectional image to match a direction of the first cross-sectional image, and control the display to display the second cross-sectional image whose direction is adjusted.

6. The ultrasound imaging apparatus of claim 1, wherein the controller is configured to align frames of the second cross-sectional image based on a phase of a heart rate period associated with the first cross-sectional image, and control the display to display the second cross-sectional image in synchronization with the heart rate period.

7. A control method of an ultrasound imaging apparatus including an ultrasound probe, a controller, and a display, the method comprising:
   transmitting an ultrasound signal and receiving an ultrasound echo signal by the ultrasound probe at a first position of the object and at a second position of the object;
   processing the ultrasound echo signal with the controller to obtain a first 4D image of a heart at the first position, wherein the first position is located at a side of the spine and between the ribs;
   processing the ultrasound echo signal with the controller to obtain a second 4D image of the heart at the second position, wherein the spine or the ribs cover the heart at the second position;
   obtaining, by the controller, a biplane image from the second 4D image, wherein the biplane image includes a plurality of cross-sectional images acquired simultaneously from the second 4D image;
   controlling, by the controller, the display to display the biplane image in real-time, while the ultrasound probe is at the second position;
   monitoring, by the controller, the displayed biplane image to identify the occurrence of an artifact by detecting shadows caused by the spine or the ribs in the displayed biplane image;
   selecting, by the controller, a first cross-sectional image in which the artifact is detected among the plurality of cross-sectional images of the biplane image in response to detection of the artifact, wherein the first cross-sectional image includes a region of interest;
   identifying, by the controller, an anatomical feature within the region of interest, wherein the anatomical feature includes a shape, size and position within the region of interest;
   selecting, by the controller, a second cross-sectional image from the first 4D image, wherein the second cross-sectional image corresponds to the first cross-sectional image and includes the identified anatomical feature; and displaying, by the controller, the biplane image simultaneously with the second cross-sectional image in place of the first cross-sectional image on the display.

8. The control method of claim 7, wherein the displaying the second cross-sectional image on the display comprises:

simultaneously displaying, by the controller, the biplane image comprising the first cross-sectional image, and the second cross-sectional image.

9. The control method of claim 7, wherein the displaying the second cross-sectional image on the display comprises:

displaying, by the controller, by overlaying the second cross-sectional image on the first cross-sectional image.

10. The control method of claim 7, wherein the selecting the second cross-sectional image from the first 4D image comprises:

selecting, by the controller, the second cross-sectional image from the first 4D image based on a predefined standard view.

11. The control method of claim 7, wherein the displaying the second cross-sectional image on the display comprises:

adjusting, by the controller, a direction of the second cross-sectional image to match a direction of the first cross-sectional image.

12. The control method of claim 7, wherein the displaying the second cross-sectional image on the display comprises:

aligning, by the controller, frames of the second cross-sectional image based on a phase of a heart rate period associated with the first cross-sectional image; and displaying, by the controller, the second cross-sectional image in synchronization with the heart rate period.

* * * * *